United States Patent
Ng et al.

(10) Patent No.: US 10,701,349 B2
(45) Date of Patent: Jun. 30, 2020

(54) METHOD FOR CALIBRATING A MULTI-VIEW DISPLAY

(71) Applicant: Misapplied Sciences, Inc., Redmond, WA (US)

(72) Inventors: Albert Han Ng, Redmond, WA (US); Paul Henry Dietz, Redmond, WA (US); David Steven Thompson, Redmond, WA (US)

(73) Assignee: Misapplied Sciences, Inc., Redmond, WA (US)

( * ) Notice: Subject to any disclaimer, the term of this patent is extended or adjusted under 35 U.S.C. 154(b) by 0 days.

(21) Appl. No.: 15/002,014

(22) Filed: Jan. 20, 2016

(65) Prior Publication Data

US 2016/0212417 A1    Jul. 21, 2016

Related U.S. Application Data

(60) Provisional application No. 62/105,702, filed on Jan. 20, 2015.

(51) Int. Cl.
*H04N 13/327* (2018.01)
*H04N 5/225* (2006.01)
(Continued)

(52) U.S. Cl.
CPC .......... *H04N 13/327* (2018.05); *H04N 5/225* (2013.01); *H04N 13/307* (2018.05); *H04N 13/351* (2018.05); *H04N 2013/40* (2018.05)

(58) Field of Classification Search
CPC ............... H04N 13/0425; H04N 5/225; H04N 13/0406; H04N 13/0447; H04N 2013/0461
(Continued)

(56) References Cited

U.S. PATENT DOCUMENTS

| | | |
|---|---|---|
| 5,855,425 A | 1/1999 | Hamagishi |
| 6,339,421 B1 | 1/2002 | Puckeridge |

(Continued)

FOREIGN PATENT DOCUMENTS

| | | |
|---|---|---|
| EP | 2685735 A1 | 1/2014 |
| JP | 2004-078125 | 3/2004 |

(Continued)

OTHER PUBLICATIONS

"Non-Final Office Action", U.S. Appl. No. 15/060,527, dated May 19, 2017, 13 pp.

(Continued)

*Primary Examiner* — Ayman A Abaza
(74) *Attorney, Agent, or Firm* — Kaplan Breyer Schwarz, LLP

(57) ABSTRACT

A multi-view display is display capable of simultaneously showing different images to viewers that see the display from different locations. Viewers do not see the images intended for other viewers at other locations. A multi-view display forms images via a collection of multi-view pixels, which are the devices that make such image customization possible. A multi-view pixel is able to emit different light in different directions; in each direction, parameters of emitted light such as brightness, contrast, etc., can be controlled independently of the light emitted in other directions. In order for the display to generate good-quality images, it is useful to perform a calibration of the display that will yield accurate information about the relationships of light emitted by multi-view pixels and locations where images are to be made viewable. Embodiments of the present invention provide calibrations that achieve the desired result efficiently and accurately.

15 Claims, 12 Drawing Sheets

(51) Int. Cl.
*H04N 13/351* (2018.01)
*H04N 13/307* (2018.01)
*H04N 13/30* (2018.01)

(58) Field of Classification Search
USPC ................................................. 348/39, 59
See application file for complete search history.

(56) References Cited

U.S. PATENT DOCUMENTS

| | | | |
|---|---|---|---|
| 6,377,295 B1* | 4/2002 | Woodgate | G02B 27/0093 348/59 |
| 7,001,023 B2* | 2/2006 | Lee | H04N 9/3185 348/745 |
| 7,602,395 B1 | 10/2009 | Diard | |
| 7,990,498 B2 | 8/2011 | Hong | |
| 8,461,995 B1 | 6/2013 | Thornton | |
| 9,080,219 B2 | 7/2015 | Chang et al. | |
| 9,080,279 B2 | 7/2015 | Jun et al. | |
| 9,715,827 B2 | 7/2017 | Ng et al. | |
| 9,743,500 B2 | 8/2017 | Dietz et al. | |
| 9,792,712 B2 | 10/2017 | Ng et al. | |
| 2003/0115096 A1 | 6/2003 | Reynolds et al. | |
| 2003/0156260 A1 | 8/2003 | Putilin et al. | |
| 2005/0195330 A1 | 9/2005 | Zacks et al. | |
| 2009/0273486 A1 | 11/2009 | Sitbon | |
| 2010/0085517 A1 | 4/2010 | Hong | |
| 2010/0207961 A1 | 8/2010 | Zomet | |
| 2010/0214537 A1 | 8/2010 | Thomas | |
| 2011/0159929 A1 | 6/2011 | Karaoguz et al. | |
| 2011/0216171 A1 | 9/2011 | Barre et al. | |
| 2011/0242298 A1 | 10/2011 | Bathiche et al. | |
| 2011/0304613 A1 | 12/2011 | Thoresson | |
| 2012/0026157 A1 | 2/2012 | Unkel et al. | |
| 2012/0062565 A1* | 3/2012 | Fuchs | G06T 15/20 345/419 |
| 2012/0105445 A1 | 5/2012 | Sakai et al. | |
| 2012/0140048 A1 | 6/2012 | Levine | |
| 2012/0218253 A1 | 8/2012 | Clavin | |
| 2013/0093752 A1 | 4/2013 | Yuan | |
| 2013/0114019 A1 | 5/2013 | Ijzerman et al. | |
| 2013/0169765 A1 | 7/2013 | Park et al. | |
| 2014/0015829 A1 | 1/2014 | Park et al. | |
| 2014/0035877 A1 | 2/2014 | Cai et al. | |
| 2014/0111101 A1 | 4/2014 | McRae | |
| 2014/0118403 A1 | 5/2014 | Verthein et al. | |
| 2015/0020135 A1 | 1/2015 | Frusina et al. | |
| 2015/0042771 A1 | 2/2015 | Jensen et al. | |
| 2015/0049176 A1 | 2/2015 | Hinnen et al. | |
| 2015/0062314 A1* | 3/2015 | Itoh | G06F 3/012 348/55 |
| 2015/0085091 A1 | 3/2015 | Varekamp | |
| 2015/0092026 A1 | 4/2015 | Baik et al. | |
| 2015/0198940 A1 | 7/2015 | Hwang et al. | |
| 2015/0279321 A1 | 10/2015 | Falconer et al. | |
| 2015/0334807 A1 | 11/2015 | Gordin et al. | |
| 2016/0012726 A1 | 1/2016 | Wang | |
| 2016/0027029 A1 | 1/2016 | Poole | |
| 2016/0210100 A1 | 7/2016 | Ng et al. | |
| 2016/0224122 A1 | 8/2016 | Dietz et al. | |
| 2016/0227200 A1* | 8/2016 | Reitterer | H04N 13/349 |
| 2016/0227201 A1 | 8/2016 | Ng et al. | |
| 2016/0261837 A1 | 9/2016 | Thompson et al. | |
| 2016/0261856 A1 | 9/2016 | Ng et al. | |
| 2016/0293003 A1 | 10/2016 | Ng et al. | |
| 2016/0341375 A1 | 11/2016 | Baker | |
| 2016/0341377 A1 | 11/2016 | Eddins | |
| 2016/0366749 A1 | 12/2016 | Dietz et al. | |
| 2016/0371866 A1 | 12/2016 | Ng et al. | |
| 2017/0205889 A1 | 7/2017 | Ng et al. | |

FOREIGN PATENT DOCUMENTS

| | | |
|---|---|---|
| JP | 2012-010086 | 1/2010 |
| JP | 2012-042507 | 3/2012 |
| JP | 2014-178366 | 9/2014 |
| WO | 0224470 A | 3/2002 |
| WO | 2013183108 A1 | 12/2013 |

OTHER PUBLICATIONS

"Notice of Allowance and Fees Due", U.S. Appl. No. 15/180,341, dated Jul. 11, 2017, 7 pp.

Officer: Patricia Stein, "International Search Report and Written Opinion", dated Jun. 3, 2016, issued in related PCT Application: PCT/US2016/04122.

Officer: Patricia Stein, "International Search Report and Written Opinion", dated May 12, 2016, issued in related PCT Application: PCT/US2016/020784.

"Non-Final Office Action", dated Jan. 26, 2017, issued in U.S. Appl. No. 15/088,912.

"Non-Final Office Action" dated Jan. 31, 2017, Issued in U.S. Appl. No. 15/180,341.

"Non-Final Office Action", U.S. Appl. No. 15/002,158, dated Mar. 3, 2017, p. 19.

Authorized Officer: Mehrdad Dastouri, "International Preliminary Report on Patentability" dated Feb. 3, 2017 issued in PCT International Application PCT/US16/14122, 21 pp.

"Non-Final Office Action", dated Mar. 22, 2017, Issued in related U.S. Appl. No. 15/002,164, 28 pp.

Officer: Jeffrey Harold, "International Preliminary Report on Patentability", Completed Mar. 20, 2017, Issued in International Patent Application PCT/US2016/020784, 6 pp.

"Non-Final Office Action", dated Mar. 24, 2017, Issued in related U.S. Appl. No. 15/002,175, 26 pp.

"Non-Final Office Action", Related U.S. Appl. No. 15/184,874, dated May 22, 2017, 19 pp.

"Non-Final Office Action", Related U.S. Appl. No. 15/015,099, dated May 4, 2017, 9 pp.

Authorized Officer: Jacinta Molloy, "International Search Report and Written Opinion" dated Sep. 29, 2016 issued in PCT Application No. PCT/US2016/037185.

"Office Action" dated Oct. 6, 2016 issued in U.S. Appl. No. 15/060,527.

"Notice of Allowance", Issued in U.S. Appl. No. 15/184,874, dated Sep. 8, 2017, 14 pp.

"Final Office Action", U.S. Appl. No. 15/002,164, dated Oct. 5, 2017, 27 pp.

"Final Office Action", U.S. Appl. No. 15/002,175, dated Nov. 2, 2017, 21 pp.

"Final Office Action", U.S. Appl. No. 15/015,099, dated Nov. 13, 2017, 14 pp.

"Non-Final Office Action" dated Feb. 8, 2018 in U.S. Appl. No. 15/060,527.

"Non-Final Office Action" in U.S. Appl. No. 15/062,103 dated Feb. 14, 2018.

Final Office Action received for U.S. Appl. No. 15/060,527, dated Oct. 5, 2018, 14 pages.

Final Office Action received for U.S. Appl. No. 15/002,158, dated Oct. 5, 2018, 22 pages.

Notice of Allowance and Fees Due (PTOL-85) received for U.S. Appl. No. 15/015,099, dated Dec. 18, 2018, 5 pages.

Non-Final Rejection dated Oct. 12, 2018 for U.S. Appl. No. 15/015,099.

Final Rejection received for U.S. Appl. No. 15/944,366, dated Nov. 14, 2018, 26 pages.

Advisory Action (PTOL-303) received for U.S. Appl. No. 15/002,158, dated Dec. 20, 2018, 4 pages.

Advisory Action (PTOL-303) received for U.S. Appl. No. 15/060,527, dated Jan. 30, 2019, 3 pages.

Advisory Action (PTOL-303) received for U.S. Appl. No. 15/944,366, dated Feb. 20, 2019, 3 pages.

English Translation of Chinese Office Action dated Oct. 8, 2019 in Chinese Patent Application No. 2016800127601.

English Translation of Office Action dated Dec. 3, 2019 in Japanese Patent Application No. 2017-546647.

(56) References Cited

OTHER PUBLICATIONS

Examiner initiated interview summary (PTOL-413B) received for U.S. Appl. No. 15/060,527, dated Jan. 30, 2019, 2 pages.
"Non Final Office Action" dated Apr. 4, 2018 in U.S. Appl. No. 15/002,158, p. 23.
Non-Final Rejection received for U.S. Appl. No. 15/410,508, dated May 24, 2019, 12 pages.
Notice of Allowance and Fees Due (PTOL-85) received for U.S. Appl. No. 15/060,527, dated Mar. 14, 2019, 8 pages.
Office Action received for European Patent Application No. 16714615.8, dated Oct. 10, 2018, 4 pages.
Office Action issued in European patent application No. 16714615.8, dated Aug. 9, 2019, 5 pp.

* cited by examiner

Multi-View Lenticular Picture 100

Image Interleaving 200

Dual-View Lenticular Poster 300

Stereoscopic Lenticular Picture 400
(from above)

Lens Array of Spherical Lenses 500

Principle of Image Projection 600

Array 900 of Multi-View Pixels in a Multi-View Display

Alignment of Beamlets in a Theater

Pixel Identification via Cartesian Coordinates

Multi-View Display 1210 with Multi-View Pixels Arranged in Concentric Circles

Seating Chart 1300 for a Theater

Calibration of Beamlets in a Theater via a Camera

Flow Diagram 1500 for Calibrating Multiview Display 700

Camera-Based Localization System 1600

METHOD FOR CALIBRATING A MULTI-VIEW DISPLAY

CROSS REFERENCE TO RELATED APPLICATIONS

The underlying concepts, but not necessarily the language, of the following case are incorporated by reference:

(1) U.S. provisional application No. 62/105,702; and

If there are any contradictions or inconsistencies in language between this application and one or more of the cases that have been incorporated by reference that might affect the interpretation of the claims in this case, the claims in this case should be interpreted to be consistent with the language in this case.

This case claims benefit of the following provisional applications:

(1) U.S. provisional application No. 62/105,702;
(2) U.S. provisional application No. 62/141,716;
(3) U.S. provisional application No. 62/174,476; and
(4) U.S. provisional application No. 62/180,300.

FIELD OF THE INVENTION

The present invention relates to electronic displays, and, more particularly, to electronic displays intended for simultaneously displaying multiple distinct images.

BACKGROUND

Ever since antiquity, people have created pictures. In ancient times, pictures were exclusively still pictures generated, for example, by painting, or drawing on a surface. In modern times, photography has provided the ability of creating pictures through technological tools, and cinematography has provided the ability to create moving pictures, first in black and white and, later, in color. More recently, electronic displays, such as computer monitors, TV sets, and projectors, have become the most common devices for displaying moving pictures.

With very few exceptions, electronic displays generate pictures that are perceived the same regardless of the position of the viewer. Indeed, a lot of engineering effort has been devoted to achieving displays with a wide viewing angle and with minimal degradation of the picture even for viewers looking at the display from directions that are very different from optimal. There are, however, situations where it is desirable to have a display that shows different pictures when viewed from different angles. Such displays are known as multi-view displays. For still pictures, techniques have been available for a long time to achieve such as a result, albeit with limited picture quality and with other important limitations.

FIG. 1 depicts a so-called lenticular picture 100 in the prior art. A lenticular picture provides multi-view functionality for still images. It is realized as a picture that a viewer 130 can hold in his/her hand. The lenticular picture comprises a grooved sheet of plastic with a paper backing. The front of the sheet of plastic is shaped such that the grooves form an array 110 of cylindrical lenses, as shown in detailed view 115 in the figure. The paper backing is a print of two or more interleaved images; the print is shown in FIG. 1 as interleaved print 120.

In FIG. 1, the grooves constituting the cylindrical lenses of array 110 are arranged horizontally. As a consequence, the viewer 130 of the lenticular picture can rotate the picture about a horizontal axis 140 in order to see different images.

As the lenticular picture is rotated in the direction, for example, of rotation 150, different images become sequentially visible on the viewable surface of the lenticular picture, with each sequential image occupying the entire viewable surface, when visible. While one sequential image is visible, the other sequential images are not visible.

FIG. 2 Illustrates the process of creating interleaved print 120. In this example, the objective is that the final lenticular picture will show two distinct sequential images, one with a large letter "A", and the other with a large letter "B".

Each one of the two images is processed by slicing it into a large number of horizontal stripes, and then every other stripe is removed. In FIG. 2, the result of this process for the letter "A" is shown as first image 210-1. The familiar outline of the letter "A" is clearly identifiable even though a large number of white stripes obliterate part of it. The result of the same process for the letter "B" is shown as second image 210-2. Again, the outline of the letter "B" is clearly identifiable.

There is an important difference between the two processed images: in the case of the letter "B", the stripes that were removed were not the same stripes that were removed when processing the letter "A"; rather, they were the alternate stripes. As a consequence, the two images can be combined with the stripes of one image fitting (interleaving) between the stripes of the other image. The result is shown in FIG. 2 as interleaved image 220, which can be printed on paper to create interleaved print 120 for the lenticular picture.

The functionality of the lenticular picture is based on a phenomenon that can be explained via geometrical optics: at any viewing angle, the cylindrical lenses show only a set of narrow horizontal stripes from the underlying printed image. The set of stripes that is shown depends on the viewing angle, and it changes when the viewing angle changes. By rotating the lenticular picture about horizontal axis 140, viewer 130 can cause the lenticular picture to show different sets of stripes from the underlying print. When the set of stripes being shown falls on top of stripes from the letter "A", the viewer will see a letter "A"; however, when the viewing angle is changed such that the set of stripes being shown falls on top of stripes form the letter "B", the viewer will see a letter "B". In both cases, the other letter is not visible at all because no other stripes are made visible by the cylindrical lenses.

The interleaving process illustrated in FIG. 2 can be implemented for more than two images. For example, a lenticular picture can show three distinct images, each at a different viewing angle. To realize such a lenticular picture, each of the three images is sliced into equal-size stripes, but only every third stripe is retained. The three sets of retained stripes are then combined into a single interleaved print.

For a lenticular picture to operate as planned, the alignment and scaling of the print relative to the lens array must be precise. Of course, the cylindrical lenses must be carefully aligned with the stripes, or else different images might become visible simultaneously in different parts of the picture. Additionally, the spacing of the stripes, relative to the spacing of the cylindrical lenses, must be calculated and implemented with precision. FIG. 1 shows that the viewing angle from the viewer's eyes to the surface of the picture is different in different parts of the picture, and the exact extent of difference depends on the distance between the viewer and the picture. Accordingly, the spacing of the stripes needs to be slightly different from the spacing of the cylindrical lenses, and it depends on the desired viewing distance.

For these reasons, it is difficult to create lenticular pictures with more than a few different images, and it is difficult to achieve image quality comparable to that of conventional pictures. As a result, lenticular pictures have not progressed much beyond novelty items and specialized applications. The problem of achieving the necessary precision alignment remains an important obstacle to wider use of lenticular pictures and other types of multi-view displays.

FIG. 3 depicts a prior-art application for a dual-view lenticular picture. A poster 300 for public viewing is realized as a lenticular picture with horizontal cylindrical lenses. The poster is shown in a public area where both adults and children might be present. The objective of the poster is to show a message intended for adults that might be unsuitable for young children. Because young children are generally shorter than adults, the angle from which they view the poster is different from the angle of view of an adult. This is illustrated in FIG. 3, where child 310 can be observed to have a different view of the poster, compared to adult 320.

The lenticular picture of poster 300 can be adjusted to show one image to individuals taller than a certain height, who can be presumed to be adults, while children, who are shorter, see a different image. For the poster to work correctly and achieve the desired objective, it is necessary to know a number of parameters with good accuracy prior to manufacturing the poster. The needed parameters include, among others, the viewer-height threshold at which the changeover from one image to the other is to occur, the distance between the viewers and the poster, and the height above ground where the poster is going to be installed. Such parameters and others need to be known with a good level of precision, and the installation locale must be such that these parameters do not vary significantly from viewer to viewer. These are significant constraints, and they illustrate the reason why multi-view pictures of this type are not more common.

FIG. 4 depicts another prior-art application of multi-view lenticular pictures. The figure illustrates the principle of operation of a stereoscopic lenticular picture. Seen from above, on the left in the figure, a viewer's head 410 is looking at stereoscopic lenticular picture 400. The viewer's left eye 420 and right eye 430 are depicted in the figure. The viewer's left eye sees the picture from an angle that is slightly different from the angle of view of the right eye.

Unlike the lenticular pictures in the previous figures, the cylindrical lenses in lenticular picture 400 are aligned vertically instead of horizontally and, of course, the multiple images on the interleaved print are interleaved with vertical stripes instead of horizontal stripes. As a consequence, different images become sequentially visible when the viewer moves horizontally relative to the picture.

The left eye and the right eye of the viewer see the lenticular picture 400 from different positions that are shifted horizontally, relative to one another; and the parameters of the lenticular picture can be selected such that the two eyes see different images. The desired stereoscopic effect is achieved when the two different images are the images that the left and right eyes would see when looking at the original subject of the picture.

FIG. 5 shows a lens array in the prior art wherein the individual lenses are spherical lenses instead of cylindrical lenses.

FIG. 6 illustrates the principle of operation of a typical image projector. The illustration applies to old-fashioned movie projectors and slide projectors that project images from film, and it also applies to modern electronic projectors. In all such cases, the image to be projected onto a screen originates as a bright image that emits light, shown in the figure as bright image 610. In the case where film is used for the image, the light comes from a bright light bulb behind the film, and the film acts as a filter that selectively allows the passage of light of different colors and intensities in different portions of the image. A similar technique is used in some modern projectors wherein the filter might be an LCD module or some other type of electronic light filter, instead of film. Alternatively, the bright image might be generated by an array of bright sources such as, for example, light-emitting diodes, or by digital micromirror devices that reflect light from a separate source.

The term "pixel" is widely used in conjunction with images and image processing. It is a contraction of "picture element" and it refers to the smallest image-forming unit of a display. In particular, an image such as bright image 610 is generally composed of a large number of pixels, wherein each pixel emits light in a wide range of directions. Each pixel emits light of a particular color and intensity, such that the collection of all the pixels forms a pattern that is perceived as an image by the human eye.

In a projector, as depicted in FIG. 6, some of the light emitted by each pixel is collected by a lens 620. In the figure, two pixels are highlighted explicitly as pixel 630-1 and 630-2. The figure shows, for example, the light 640-1 emitted by pixel 630-1 and collected by the lens 620. The lens is adjusted such that the light collected from the pixel is focused into a light beam 650-1 with a focal point is on a projection screen some distance away (the screen is not shown explicitly in the figure). When the light beam 650-1 reaches the screen, it produces a bright spot on the screen. The color and brightness of the spot are the same as the color and brightness of pixel 630-1 in the bright image 610. The light 640-2 from pixel 630-2 is also processed by the lens 620 in similar fashion, such that it also produces a bright spot on the screen whose color and brightness are the same as the color and brightness of pixel 630-2. All the pixels of the bright image 610 produce bright spots on the screen in similar fashion. The collection of all the bright spots on the screen forms the projected image.

In a typical projector, very few adjustments are needed for achieving a clear projected image on the screen. Typically, it is only necessary to adjust the focus of the lens for the specific distance of the screen from the projector. Once the focus is adjusted, the image on the screen is equally clear for all viewers. Displays such as conventional television sets and computer monitors require no adjustment at all. In contrast, multi-view displays need extensive adjustments. As noted above, even simple lenticular pictures rely on a precise alignment and precise positioning of the interleaved print relative to the array of cylindrical lenses. More generally, multi-view displays need adjustments that are specific to the viewer's position relative to the display. When multiple viewer positions are possible, the amount of adjustment needed can be substantial, and multi-view displays need to be calibrated in order to achieve the necessary adjustments. It would be advantageous to have multi-view displays wherein the calibration procedure is simple, or automatic, or both.

SUMMARY

A multi-view display is able to show different images to different viewers. Based on the position of the viewer relative to the multi-view display, each viewer sees a different image while looking at the display surface of the multi-view display and does not see the images seen by other viewers. This is in contrast to conventional displays which show the same image to all viewers regardless of where the viewers are positioned relative to the display.

In a typical conventional display, a visible image is formed as a collection of pixels (the word "pixel" is a contraction of "picture element"). Each pixel emits light in response to electrical excitation. The brightness of a pixel depends on the extent of excitation. Each pixel emits light in all directions, such that all viewers perceive pixels the same way, regardless of viewer position.

In a multi-view display, instead, an image is formed as a collection of multi-view pixels. A multi-view pixel can control not just the brightness, but also the spatial distribution of emitted light. In particular, a multi-view pixel can be commanded, for example, and without limitation, to emit light in certain directions but not others; or it can be commanded to independently adjust the brightness of light emitted in different directions. Other parameters of emitted light can also be adjusted independently for different directions of emission.

The word "beamlet" is defined in this disclosure for the purpose of more easily presenting embodiments of the present invention. As defined below in greater detail, a beamlet is an element of emitted light that can be individually controlled. In particular, a beamlet is the light emitted by a multi-view pixel in a range of directions, which is often narrow, wherein overall emitted light can be controlled independently of the light emitted in other directions.

FIGS. 7-9 illustrate the design and functionality of multi-view displays and multi-view pixels. In particular, FIG. 8 illustrates how a multi-view pixel might be designed to emit a plurality of beamlets. The precise direction in which an individual beamlet is emitted depends on the position and orientation of the multi-view pixel. When a multi-view display is manufactured, it is possible, in theory, to precisely adjust the positions and orientations of its multi-view pixels relative to one another and relative to the body of the multi-view display. However, this is difficult to accomplish in practice, and, even with very precise adjustment, there are unavoidable uncertainties related to how the multi-view display is installed, and related to the geometry of the environment where it is used.

Because of the above uncertainties, it is advantageous to calibrate the multi-view display after it is manufactured. Calibration can be performed in the factory, and it can also be performed in the field. Calibration, as realized via embodiments of the present invention, is a process that yields a table of relationships between locations in the viewing space of the multi-view display, and beamlets. When a user of the multi-view display desires to show a particular image to viewers located at a particular location, the table indicates which beamlets should be used.

In accordance to an illustrative embodiment of the present invention, after a multi-view display is installed, a human operator carries a camera to a particular location where images are to be viewed. The camera is aimed at the display surface of the multi-view display. The camera records sequential images displayed by the multi-view display while the multi-view display displays a sequence of calibration patterns.

An image processor processes the sequence of recorded images to ultimately extract a list of beamlets visible from that location. Ideally, the list contains beamlets for each one of the multi-view pixels of the multi-view display. The human operator then moves the camera to a second location and repeats the process to ultimately extract a list of beamlets visible from that second location. The process is then repeated again, until all locations of interest are covered.

In some embodiments of the present invention, mathematical techniques are used to derive portions of the list of beamlets for multi-view pixels that might not be adequately captured in camera images. Also, in some embodiments, mathematical techniques are used to derive lists of beamlets for locations that were not covered by the human operator with the camera. The availability of such mathematical techniques reduces the time required to complete the calibration.

The foregoing brief summary summarizes some features of some embodiments of the present invention. It is to be understood that many variations of the invention are possible, and that the scope of the present invention is defined by the claims accompanying this disclosure in conjunction with the full text of this specification and the accompanying drawings.

DETAILED DESCRIPTION

Figure 7:
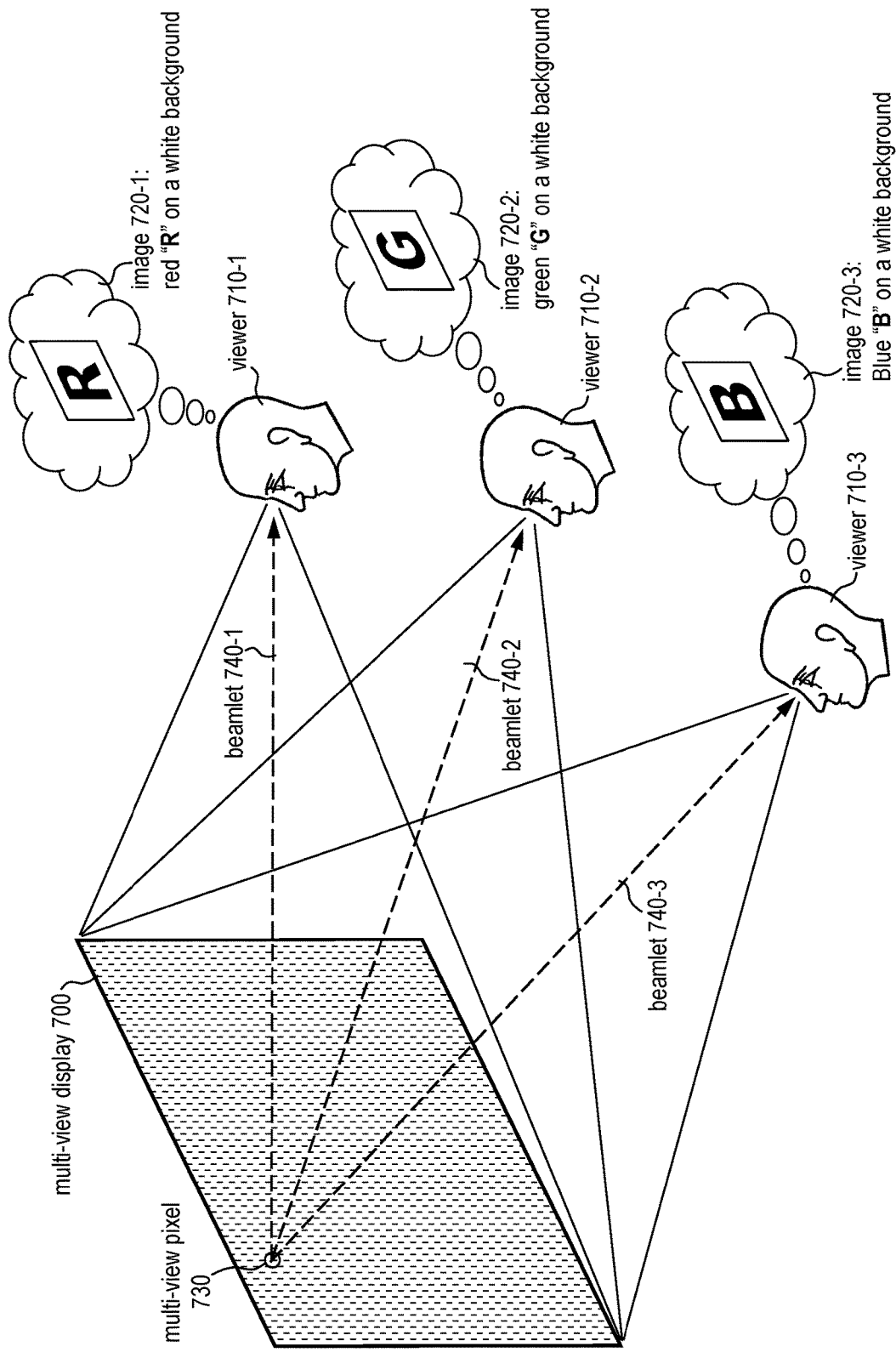
FIG. 7 illustrates the functionality of a multi-view display.

FIG. 7 illustrates the functionality of a multi-view display. In the figure, multi-view display 700 is viewed simultaneously by three viewers 710-1, 710-2, and 710-3. The three viewers are positioned at three distinct positions from which the multi-view display is visible. Each of the three viewers sees a different image on the display surface of the multi-view display. The three different images seen by the three viewers are depicted in the figure as images 720-1, 720-2, and 720-3. In particular, viewer 710-1 sees a red letter "R" on a white background, viewer 710-2 sees a green letter "G" on a white background, and viewer 710-3 sees a blue letter "B" on a white background.

For each of the three viewers, the experience of viewing the display is similar to viewing a conventional display, such as a standard television set, but each viewer sees a different image on the display surface of the multi-view display. Each viewer is, possibly, not even aware that other viewers are seeing different images. Hereinafter, the term "viewing space" will be used to refer to the range of possible positions for viewers to experience the multi-view display functionality.

The functionality of multi-view display 700 is based on the functionality of the individual multi-view pixels of the multi-view display. One such multi-view pixel is depicted in FIG. 700 as multi-view pixel 730. The functionality of the multi-view pixel is best understood by comparison with the functionality of a conventional pixel in a conventional display. A conventional pixel is simply a light source that emits a particular type of light in all directions of emission. For example, in a conventional television set, a pixel is typically implemented with a material that glows when electrically excited. The glow is typically in one of the three primary colors. The glowing material emits colored light uniformly in all directions.

In a scenario like the one depicted in FIG. 7, if the display were a conventional display, the light emitted by each conventional pixel would reach the eyes of the three viewers with the same color and, approximately, the same brightness. All three viewers would see the same image on the display surface, as a collection of glowing conventional pixels.

In contrast to a conventional pixel, multi-view pixel 730 is able to emit different light in different directions. In each direction, light of a particular type is emitted as a narrow beam. Hereinafter, such a narrow beam will be referred to as a "beamlet". FIG. 7 depicts three beamlets 740-1, 740-2, and 740-3, wherein beamlet 740-1 is aimed at the eyes of viewer 710-1, beamlet 740-2 is aimed at the eyes of viewer 710-2, and beamlet 740-3 is aimed at the eyes of viewer 710-3.

In the illustrative example of FIG. 7, to avoid clutter, the beamlets are depicted as simple dashed lines with an arrowhead indicating the direction of propagation of beamlet light; however, beamlets can have any size and shape. For example, and without limitation, beamlets might have a shape similar to the beam from a searchlight, although, of course, much smaller; but, in general, the optimal size and shape of beamlets depends on the application, environment, and construction of the multi-view display. Multi-view displays for different uses will generally have different beamlet sizes and shapes. Possibly, different beamlet sizes and shapes might even be found together in the same multi-view display, or even in the same multi-view pixel. In some of the figures accompanying this disclosure, where necessary, the width of beamlets is shown explicitly, in other figures, where it is not necessary to explicitly show beamlet width, dashed lines are used.

In the scenario of FIG. 7, each beamlet is wide enough such that both eyes of each viewer can be expected to be within the same beamlet. Therefore, both eyes are expected to see the same light. However, multi-view displays can exist wherein beamlets are small enough that distinct beamlets reach the two distinct eyes of a viewer.

In the illustrative example of FIG. 7, the three beamlets 740-1, 740-2, and 740-3 each carry light corresponding to the brightness of the image that each viewer is supposed to see. For example, as noted above, viewer 710-2 sees a green letter "G" on a white background, while viewer 710-3 sees a blue letter "B" on a white background. Correspondingly, there are areas of the display surface where viewer 710-2 is supposed to see the color white while viewer 710-3 is supposed to see the color blue. If multi-view pixel 730 lies in one such area, beamlet 740-2 will carry white light, while beamlet 740-3 will carry blue light. As in conventional displays, viewers perceive images as a collection of pixels of various colors and brightness. With a multi-view display, the ability of multi-view pixels to emit different beamlets in different directions makes it possible for different viewers to perceive the same multi-view pixel as having different colors and different brightnesses, such that each viewer sees the collection of multi-view pixels as a different image.

Figure 1:
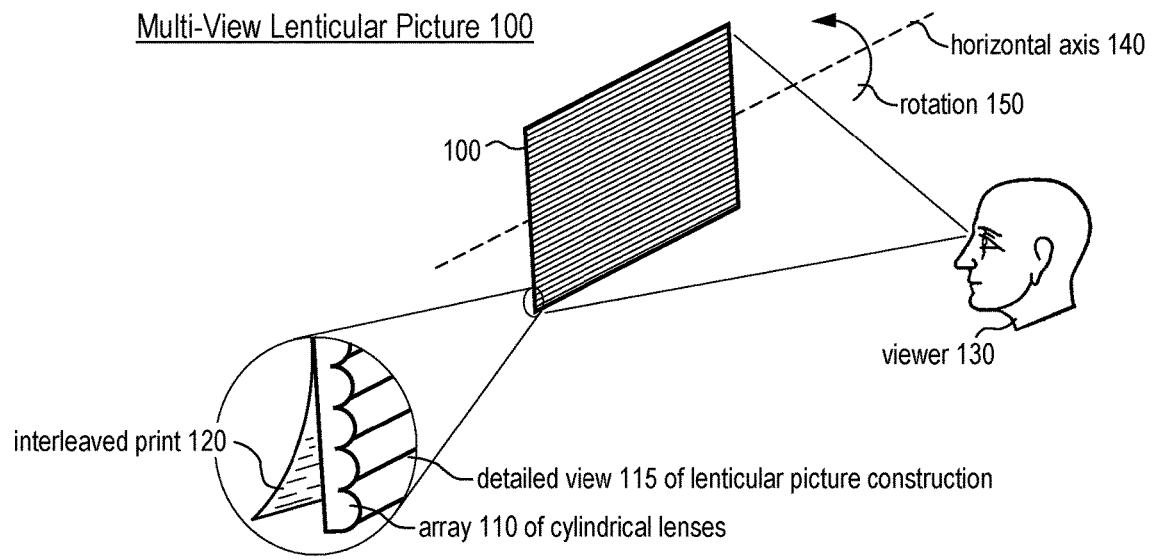
FIG. 1 depicts the structure and usage of a multi-view lenticular picture.
Figure 2:
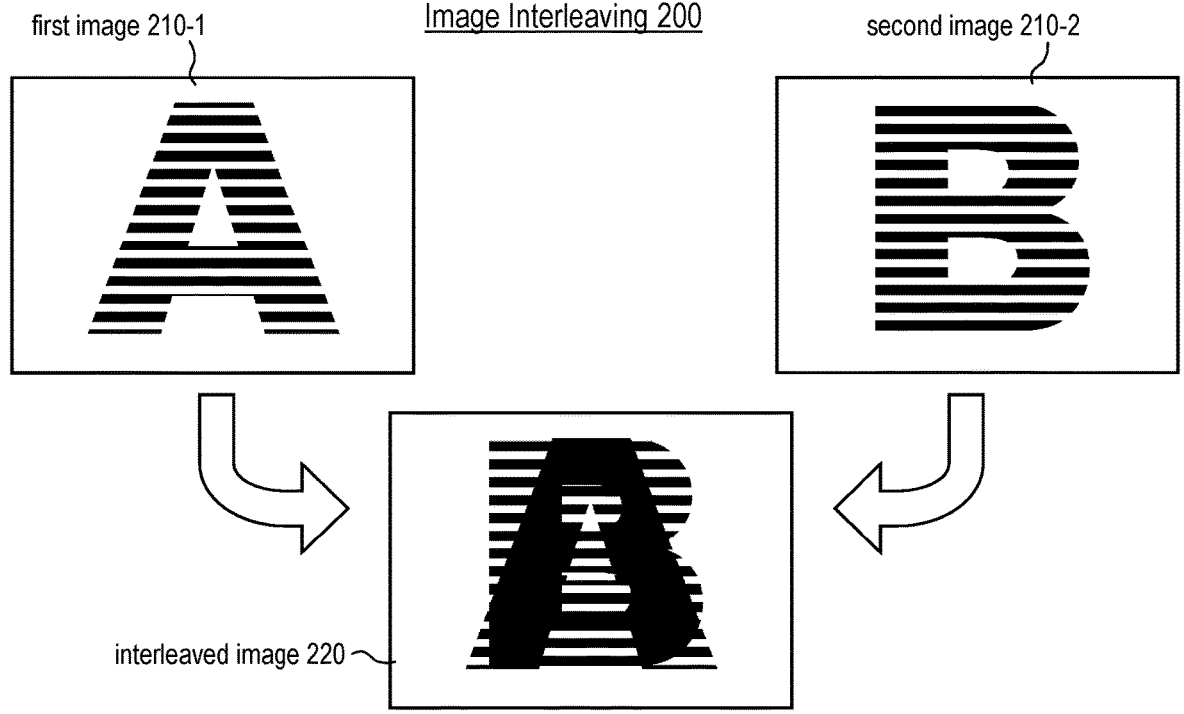
FIG. 2 illustrates the process of creating an interleaved print from two distinct images.
Figure 8:
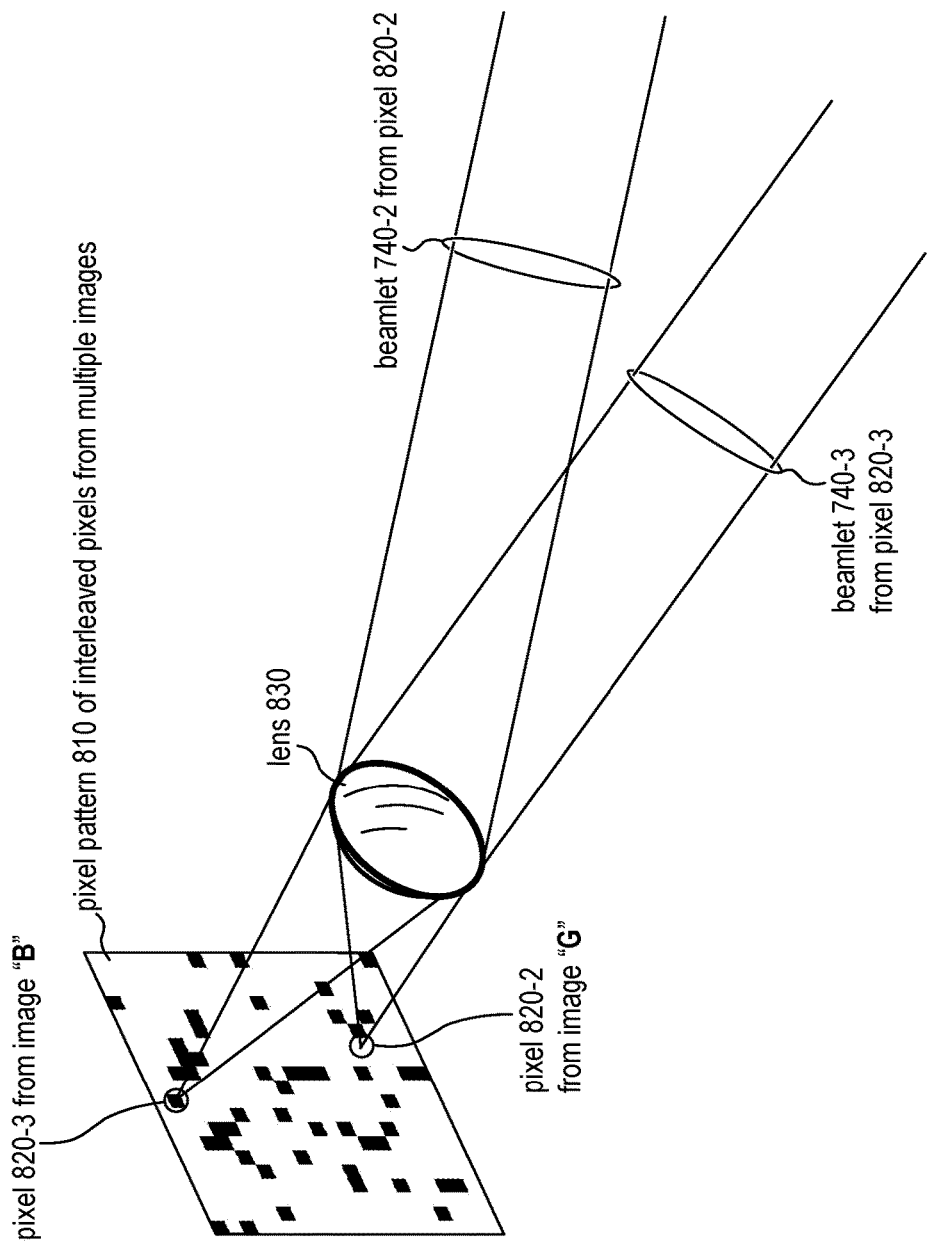
FIG. 8 depicts an illustrative implementation of a multi-view pixel.

FIG. 8 depicts a possible illustrative implementation of multi-view pixel 730. The multi-view pixel comprises a pixel pattern 810, which is analogous to the interleaved image 220 of FIG. 2. In FIG. 8, pixel pattern 810 is a rectangle with 400 conventional pixels arranged in a 20×20 array. It enables the multi-view pixel to emit as many as 400 different beamlets. Each beamlet originates as a pixel in pixel pattern 810.

Lens 830 implements the conversion of a pixel in pixel pattern 810 into a beamlet. In particular, pixel 820-2 is the pixel that is converted into beamlet 740-2. As already noted, beamlet 740-2 is supposed to carry white light. Accordingly, pixel 820-2 is a conventional pixel that comprises a material able to glow emitting white light when electrically excited with an appropriate electrical excitation. In the illustrative implementation of FIG. 8, pixel 820-2 is electrically excited and emits white light in all directions. Lens 830 collects a sizable fraction of the emitted white light and collimates it into beamlet 740-2. Similarly, pixel 820-3 is the pixel that is converted into beamlet 740-3, and it is supposed to carry blue light. Correspondingly, pixel 820-3 is a conventional pixel that comprises a material able to glow emitting blue light. In the illustrative implementation of FIG. 8, pixel 820-3 is emitting blue light in all directions. Lens 830 collects a sizable fraction of the emitted blue light and collimates it into beamlet 740-3.

The depiction of multi-view pixel 730 in FIG. 8 is intended to be representative of all the multi-view pixels in multi-view display 700 as well as of similar multi-view pixels in other multi-view displays. Accordingly, this disclosure will refer to "the pixel pattern 810" or "the lens 830" of a multi-view pixel other than multi-view pixel 730 in order to refer to the equivalent structure of that other multi-view pixel.

Figure 6:
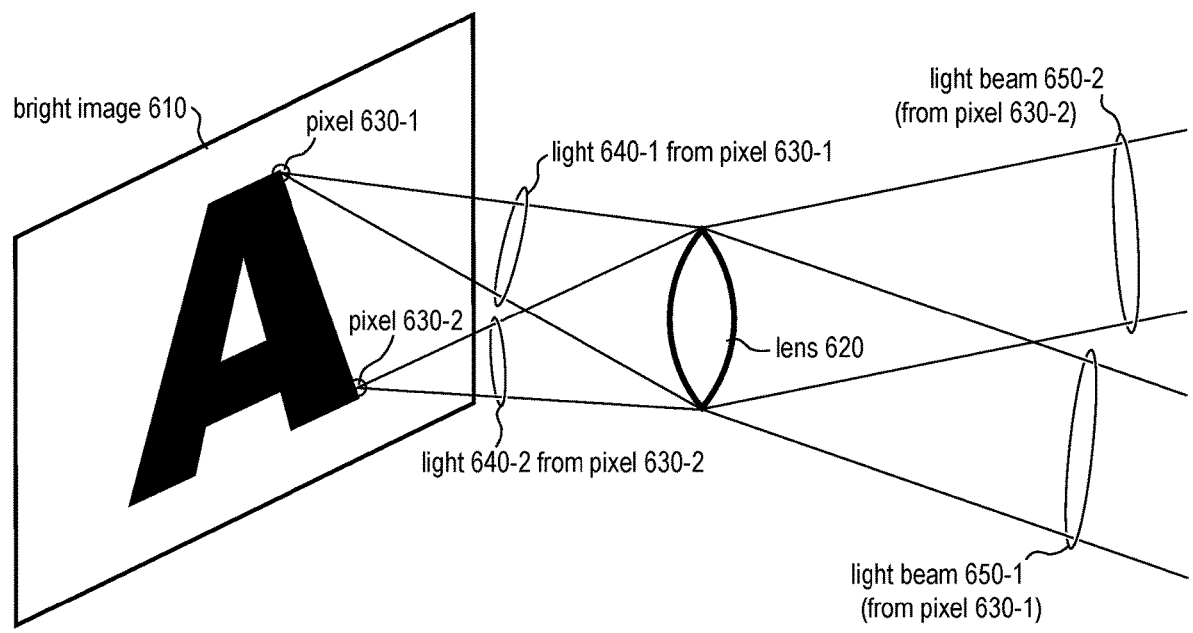
FIG. 6 illustrates the principle of operation of a typical image projector.

The depiction of multi-view pixel 730 presented in FIG. 8 is similar to the illustration of the principle of image projection presented in FIG. 6. Indeed, the functionality of a multi-view pixel is similar to the functionality of an image projector, with some important differences:

Difference 1: An image projector is typically used for projecting an image onto a screen for viewing. It is desirable for the projected image to be as sharp as possible. Accordingly, a projector's lens is adjusted for best focus. In a multi-view pixel, such an adjustment would result in beamlets that are very small at the focal distance. This is not usually desirable because the optimal size of beamlets depends on the desired multi-view experience provided to viewers. For example, and without limitation, if all viewers in a particular area of a room are supposed to see the same image, this can be accomplished via beamlets that are as large as that area of the room. Also, an ideally-focused projector creates non-overlapping dots on the screen. In contrast, it might be desirable for adjacent beamlets to overlap somewhat, so as to avoid gaps in the viewing space.

Difference 2: An image projector typically has non-overlapping pixels of different colors. Usually, each pixel emits only one of the three primary colors. Correspondingly, the projected image consists of non-overlapping dots wherein each dot is of one of those colors. The visual perception of a full color palette is achieved because, from a distance, the individual dots are not resolved by the human eye, and the three primary colors blend together into a perceived color that depends on the relative strength of the primary colors. In contrast, a beamlet of a multi-view pixel might need to be able to carry the full palette of possible colors. For example, beamlet 740-2 is supposed to carry white light because the background of image 720-2 is white. To allow the background of image 720-2 to be any color, beamlet 740-2 should be able to carry light of any color. Therefore, in the illustrative implementation of FIG. 8, pixel 820-2 should be able to emit light of any color.

In alternative implementations, beamlets might be sized large enough to have substantial overlap, such that, at each position in the viewing space, three or more beamlets are simultaneously visible from the same multi-view pixel or from nearby multi-view pixels. In such implementations, it might be acceptable to have monochromatic (single-color) beamlets, because the relative strength of overlapping beamlets can be adjusted to yield a desired color perception.

Figure 9:
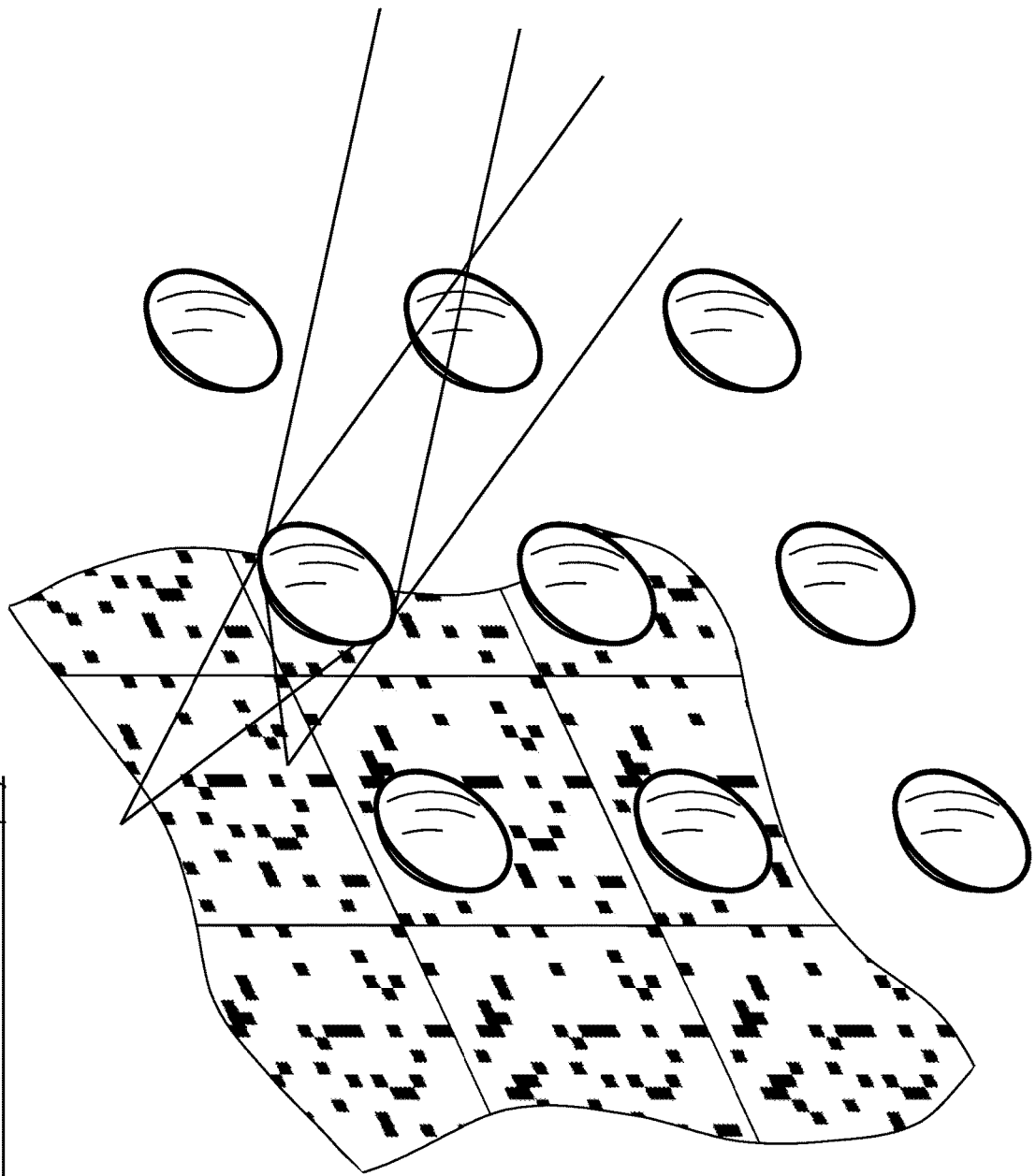
FIG. 9 illustrates how multiple multi-view pixels might be assembled together as an array to form a multi-view display.

Difference 3: An image projector must emit light bright enough for a visible image to form on the screen. Indeed, a person that walks in front of a projector and looks toward the projector usually finds the brightness annoying and objectionable. In contrast, a viewer of a multi-view display is looking directly at the light emitted by the multi-view pixels. The light must be bright enough to be visible, but not so bright as to be objectionable. As a result, multi-view pixels, if used as projectors, can be expected to be inadequately faint. The resulting projected image is likely to be virtually difficult to detect in normally-lighted environments FIG. 9 illustrates how multiple multi-view pixels might be assembled together as an array to form a multi-view display. In a conventional display, a regular (usually rectangular) array of adjacent pixels is typically used to form images. In a multi-view display in accordance with the illustrative example of FIG. 9, the multi-view pixels are also arranged in a rectangular array, a portion of which is shown in the figure. The pixel patterns 810 of the multi-view pixels are juxtaposed in a rectangular array, and the lenses 830 are placed each in front of the associated pixel pattern, so that they, too, are arranged in a rectangular array.

A viewer of the multi-view display such as, for example, viewer 720-1, looking at the array of lenses, sees one beamlet from each of the lenses. In other words, each lens appears as a disc that emits the light of the beamlet that reaches the viewer from that multi-view pixel. From a distance, the collection of discs is perceived as an image, much the same way as the collection of conventional pixels of a conventional display is perceived as an image, when viewed from a distance. Alternatively, the multi-view display might be for displaying numbers or characters as patterns of dots wherein each disc is a dot.

In FIG. 9 the lenses 830 are shown as floating in space; the support structure for the lenses is not shown. In practice, the lenses might be supported, for example, and without limitation, by a dark sheet that, in addition to mechanical support, would also provide a dark background and would block stray light from the pixel patterns 810. From a distance, the light from the pixel patterns 810 would then only reach the viewer's eyes via the beamlets that pass through the lenses. The viewer would see the lenses as illuminated discs on the dark background of the dark sheet.

A mechanical support for the lenses is not shown in FIG. 9 in order to better illustrate the arrangement of pixel patterns 810.

In electronic displays, pixels are usually arranged in a rectangular array. To prepare an image for displaying, the image is typically "rasterized", meaning that the image is subdivided into a plurality of small rectangles that match the geometry of the pixel array. The average color and brightness of each small rectangle determines the color and brightness of a corresponding pixel. In modern electronic displays the accuracy with which pixels are positioned in the pixel array is excellent, such that the correspondence between small rectangles and pixels can be derived computationally, based on the nominal geometry of the array, without the need to know in advance any additional parameters specific to the display unit that will be used for showing the image. With most conventional displays, it is also not necessary to know in advance how and where the display will be installed.

With a multi-view pixel such as multi-view pixel 730, it is reasonable to expect that the pixel pattern 810 can be made as, for example, and without limitation, a rectangular array of conventional pixels with the same degree of accuracy that is feasible for the abovementioned conventional displays. This could be expected to result in a pattern of beamlets wherein the relative geometry of the beamlets can be accurately derived form the geometry of pixel pattern 810. This, however, might not be easy to accomplish. Beamlet geometry is altered by any imperfections in lens 830, and, most important, the pattern of beamlets, as they reach locations in the viewing space, depends significantly on the geometry of the viewing space itself and on the position and orientation of the multi-view pixels relative to the viewing space.

Although FIG. 9 depicts distinct multi-view pixels as being identical to one another and identically oriented, in practice, it might be desirable for a multi-view display to have multi-view pixels of different types. Also, most likely, it is advantageous for multi-view pixels to be oriented differently in different areas of the display surface. For example, multi-view pixels near the center of the display surface could be oriented such that their beamlets propagate symmetrically outward, relative to the plane of the display surface, while multi-view pixels near the edge of the display surface could be oriented such that beamlets propagate more toward the center of the display. This might be done in order to achieve optimal coverage of the viewing space. Such differential orientation could be accomplished by changing the orientation of individual multi-view pixels placed on a flat surface, or it might be accomplished by making the display surface curved. (Conventional displays with a curved display surface are becoming increasingly common.) In other situations, such as in the case of custom multi-view displays for irregular surfaces and other similar applications, the orientations of the multi-view pixels might be in very non-standard configurations that can be difficult to characterize a-priori. In all such cases, it might be difficult to know a priori the exact orientation of each multi-view pixel. Embodiments of the present invention can advantageously provide a calibration process for learning the orientation of all beamlets of all the multi-view pixels.

Figure 10:
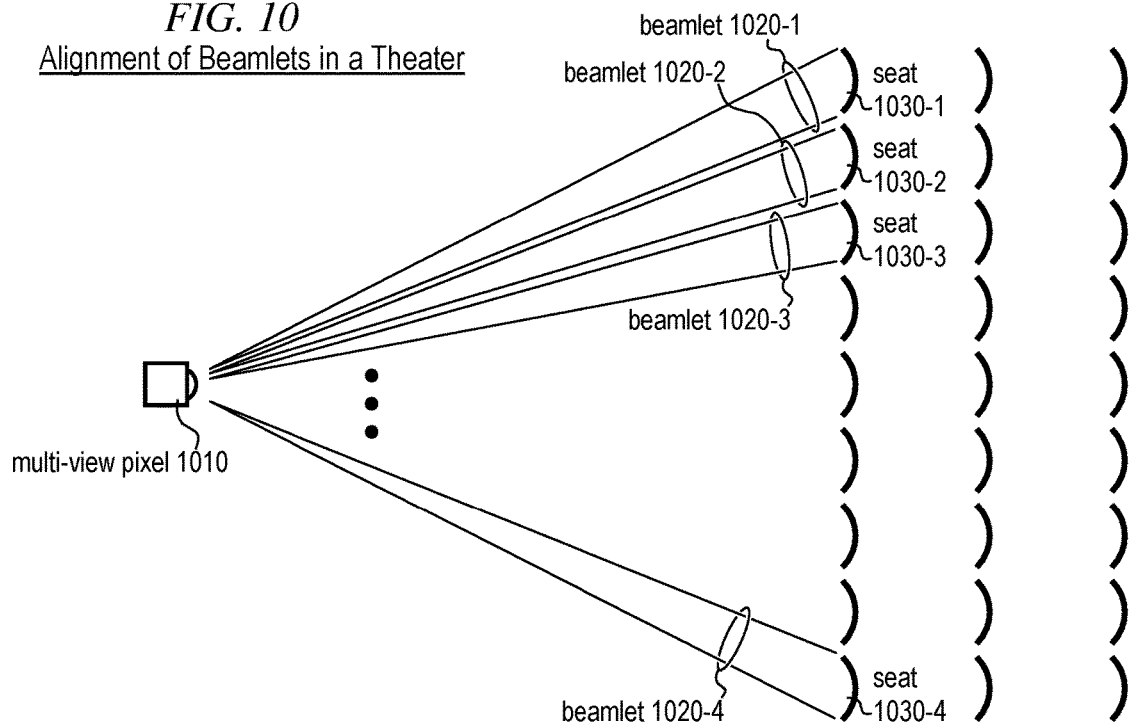
FIG. 10 illustrates the need for beamlet alignment in a theater.

FIG. 10 illustrates the situation that occurs, for example, in a theater where a multi-view display is used to show different images to different seats. The figure depicts multi-view pixel 1010, which is part of the multi-view display. The full multi-view display is not shown explicitly in the picture to avoid clutter. The figure depicts some of the beamlets emitted by the multi-view pixel as beamlets 1020-1, 1020-2, 1020-3 and 1020-4. The figure also depicts some of the seats in the theater as seats 1030-1, 1030-2, 1030-3 and 1030-4. In the figure, beamlet 1020-1 is visible from seat 1030-1, beamlet 1020-2 is visible from seat 1030-2, beamlet 1020-3 is visible from seat 1030-3, and beamlet 1020-4 is visible from seat 1030-4.

In principle, if one knows the exact position and orientation of multi-view pixel 1010, relative to the seats, it is possible to use geometric calculations to derive which pixels in the pixel pattern 810 of multi-view pixel 1010 correspond to the various beamlets. In practice this is difficult to accomplish, as it requires a very precise installation of the multi-view display. Also, any change in the position of the multi-view display after it's installed, or any change in the arrangement of seats, would require a recalculation. Embodiments of the present invention provide calibration techniques that can be implemented after installation of the multi-view display to obtain the relationship between beamlets and positions in the viewing space easily and accurately.

Embodiments of the present invention can be used to generate a table of relationships between locations in the viewing space of a multi-view display and beamlets of multi-view pixels of the multi-view display. Commonly, display pixels are arranged in a rectangular array, which provides a natural scheme for identifying individual pixels. This method is illustrated in FIG. 11 for a multi-view display 1110.

Figure 11:
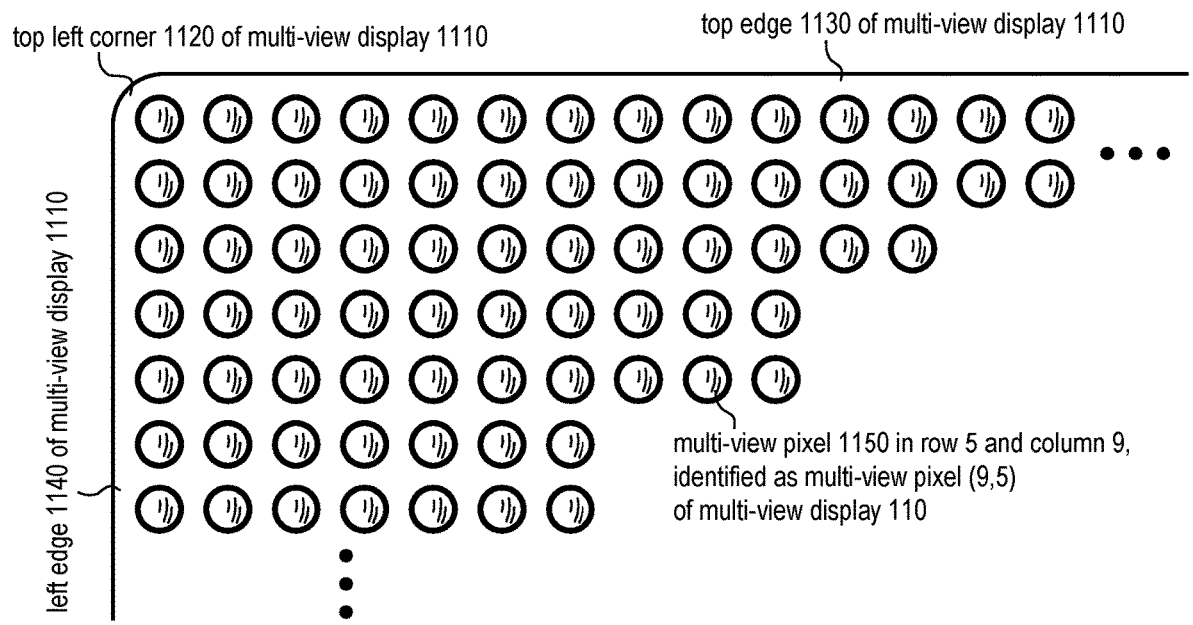
FIG. 11 depicts a portion of the display surface of a multi-view display.

FIG. 11 depicts a portion of the display surface of multi-view display 1110. In particular it depicts the top left corner 1120 of the multi-view display, the top edge 1130 of the multi-view display, and the left edge 1140 of the multi-view display. The figure also depicts several multi-view pixels near the top left corner of the display. Each pixel is represented by a depiction of its lens 830, which is what a viewer sees when looking at the multi-view display. One of the multi-view pixels is explicitly labeled as multi-view pixel 1150. It is in the fifth row of pixels and in the ninth column of pixels, counting from the top left corner of the display. Based on its position, the multi-view pixel can be identified as multi-view pixel (9,5). Because this identification scheme is based on the geometric position of the multi-view pixel, this identification scheme can be said to be geometrically-based.

The use of a geometrically-based identification scheme is advantageous because the relative position of distinct pixels can be derived computationally from knowledge of their identifiers. For example, multi-view pixel (9,5) is, of course, adjacent to multi-view pixel (9,4); but, also, for example, it is easy to show that multi-view pixel (7,4) is exactly half way between multi-view pixel (9,5) and multi-view pixel (5,3). The latter conclusion can be reached, for example, through an application of the mathematical technique known as interpolation.

In general, many mathematical techniques are known in the art for characterizing relative positions, relative orientations and other mutual geometrical relationships of objects whose position, orientation, or both are known in a quantifiable way. Hereinafter the term "geometrical coordinate" will be used to refer to a quantifiable identifier of position or orientation that is related to the geometrical position, orientation, or both of an object or entity. In the example of multi-view display 1110 in FIG. 11, the multi-view pixels are identified via their row and column numbers which meet the definition of geometrical coordinates. Indeed, row and column numbers are, essentially, the Cartesian coordinates of the multi-view pixels. It is well known in the art how to manipulate Cartesian coordinates to derive geometrical relationships between objects whose Cartesian coordinates are known.

Besides the mathematical technique known as interpolation, many other mathematical techniques are known in the art for deriving geometrical relationships from geometrical coordinates. For example, and without limitation, such mathematical techniques include linear interpolation; linear extrapolation; non-linear interpolation; non-linear extrapolation; Taylor-series approximation; linear change of reference frame; non-linear change of reference frame; quadratic, spherical, and/or exponential models; and trigonometric manipulation, as well as many others.

Figure 12:
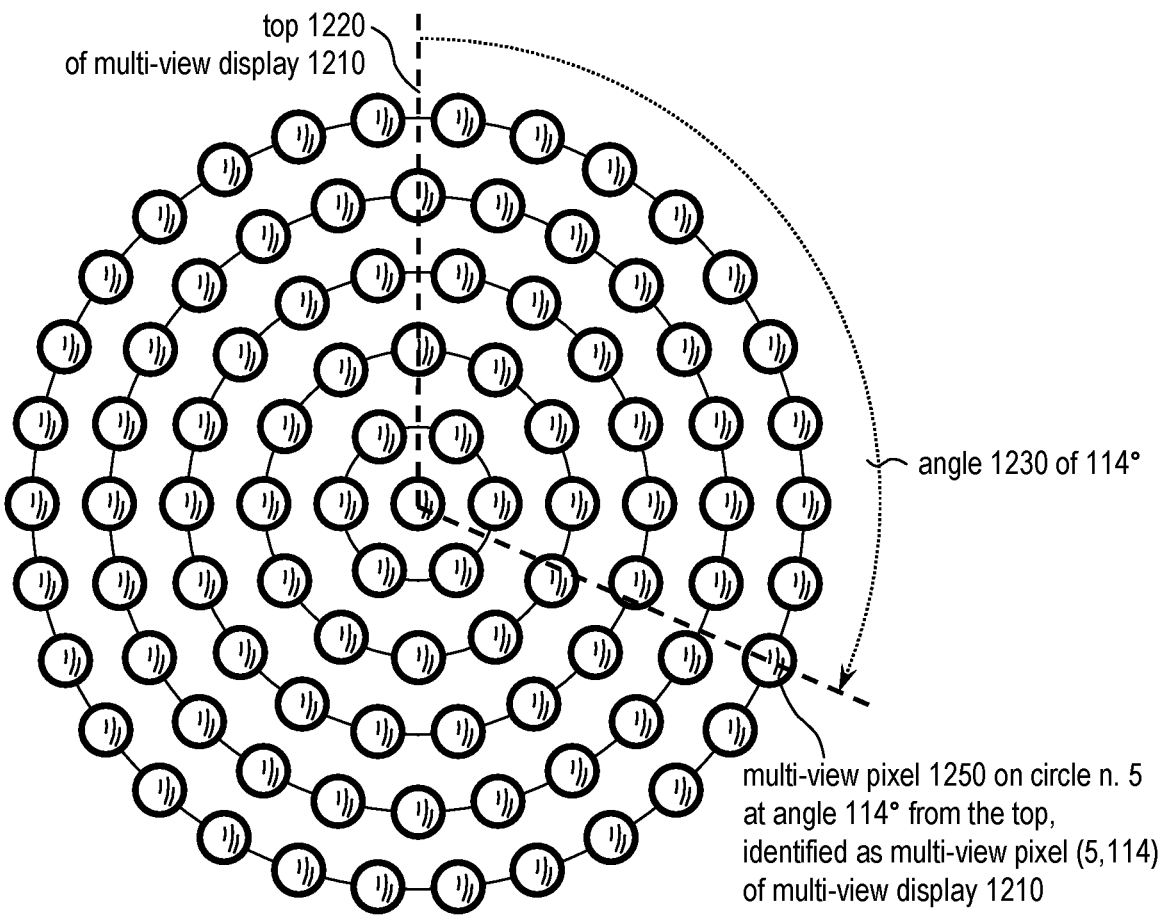
FIG. 12 depicts a portion of the display surface of a multi-view display wherein pixels are arranged in concentric circles.

FIG. 12 depicts a portion of the display surface of a multi-view display 1210 wherein multi-view pixels are arranged in concentric circles. The figure illustrates how geometrical coordinates might be used for identifying multi-view pixels in such a display. Successive concentric circles can be numbered with integer numbers starting with 0 for the center of the pattern, which can be regarded as a circle of radius 0. Each multi-view pixel can then be identified with the number of the circle where it lies, together with its angular position on that circle, as measured, for example, in degrees clockwise from the top 1220 of the display.

For example, in the figure, one of the multi-view pixels is explicitly labeled as multi-view pixel 1250. It lies on circle number 5. Its angular position along the circle is 114° from the top of the display. Accordingly, this multi-view pixel can be identified as multi-view pixel (5,114). This method of identifying positions is understood by those skilled in the art to be a form of polar coordinates, which are geometrical coordinates in accordance with the definition provided above. A convenient way of mathematically deriving geometrical relationships between objects identified with polar coordinates comprises converting those coordinates into Cartesian coordinates. Such a conversion is an example of a non-linear change of reference frame.

Although pixels in most displays are arranged as a geometric array wherein there is a natural way to identify pixels via geometrical coordinates, it is possible to envision displays where such identification might not be feasible. For example, a display intended to depict the night sky and its constellations might have pixels only at positions where stars are present. It is reasonable to have each star represented by a single pixel. Planetarium projectors are examples of such displays. With such a night-sky display, pixels are likely to be identified by proper names such as Sirius, Canopus, Alpha Centauri, Arcturus, Vega, Capella, etc. Such identifications are, of course, non-geometrical coordinates.

It is possible to envision one such night-sky display where multi-view capability is desired. For example, it might be desirable to have viewers in different parts of a room see different constellations. It will be clear to those skilled in the art, after reading this disclosure, how to make and use embodiments of the present invention applicable to such multi-view displays wherein multi-view pixels are identified by means other than geometrical coordinates.

Also, it will be clear to those skilled in the art, after reading this disclosure, how to make and use embodiments of the present invention for use with other types of multi-view displays whose multi-view pixels are arranged in other patterns. In such other types of multi-view displays, the arrangement of multi-view pixels might be a geometric pattern wherein multi-view pixels can be identified by one or more geometric coordinates, or it might be some other pattern.

Referring back to FIG. 8, as already noted, pixel pattern 810 of multi-view pixel 730 is a rectangle with 400 pixels arranged in a 20×20 rectangular array. Accordingly, it is convenient to identify a pixel in pixel pattern 810 via the column number and the row number of the pixel within the pixel pattern. Because each beamlet of multi-view pixel 730 originates as a pixel in pixel pattern 810, it is also convenient to use the same pair of numbers to identify the associated beamlet.

A complete identification of a particular beamlet within the entire multi-view display needs to include the identification of the multi-view pixel from which the beamlet is emitted. For example, a beamlet in multi-view display 1110 might be fully identified via a set of four numbers wherein the first two numbers are the row and column numbers of the multi-view pixel, and the next two numbers are the row and column numbers of the pixel in the pixel pattern 810 of the multi-view pixel from which the beamlet originates. For example, a beamlet emitted by multi-view pixel 1150 might be identified as (9,5,7,14) if it originates as the pixel in row 14 and column 7 of the pixel pattern 810 of multi-view pixel 1150.

It will be clear to those skilled in the art that all four numbers in the four-number beamlet identification scheme set forth in the previous paragraph are geometrical coordinates. In many implementations of multi-view displays, beamlets are similar to narrow light beams such as the light beam emitted by a laser (although beamlets are likely to be much less bright). As such, it might be convenient to characterize them the way one would characterize a straight line in three-dimensional space; i.e., via two spatial coordinates and two angular coordinates. Common names for such coordinates are vertical and horizontal intercepts and elevation and azimuth. Other types are coordinates are also possible and many other coordinate systems are well known in the art.

Because the four numbers in the four-number beamlet identification scheme defined above are all geometrical coordinates, it will be clear to those skilled in the art, after reading this disclosure, how to convert such sets of four numbers into, for example, intercepts, elevation and azimuth, or any other types of coordinates, via mathematical techniques, or vice versa. Indeed, any of the types of coordinates mentioned in the previous paragraphs can be used as an alternative identification scheme of geometrical coordinates. Mathematical techniques well known in the art can be used to convert from one such scheme into another such scheme.

Figure 3:
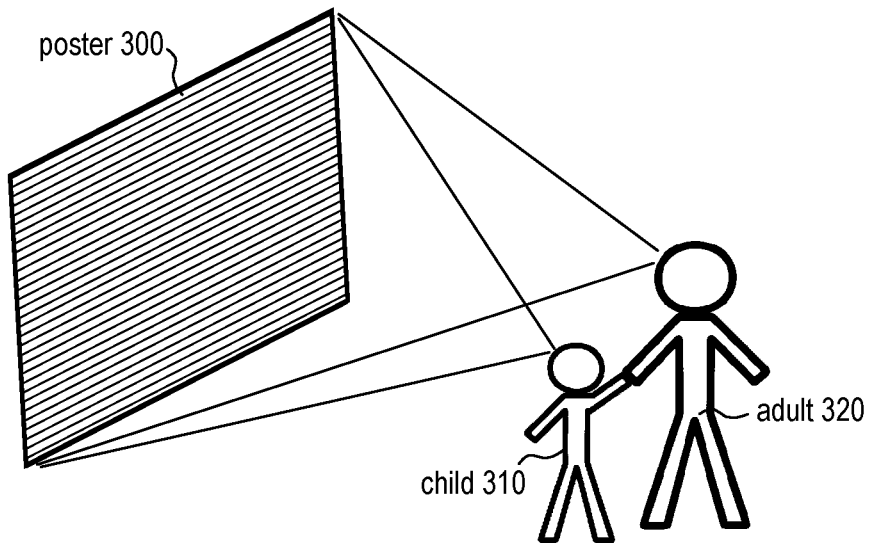
FIG. 3 depicts a prior-art application for a dual-view lenticular picture. The child and the adult see different images while looking at the poster.
Figure 4:
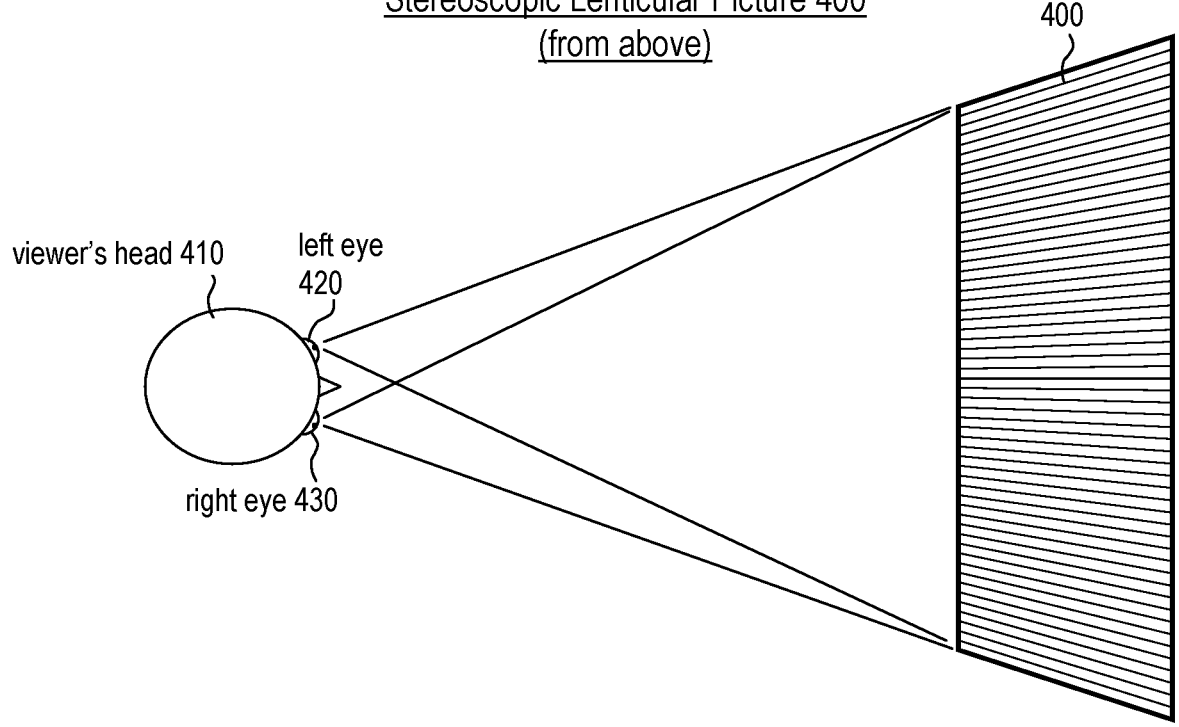
FIG. 4 depicts a stereoscopic lenticular picture.
Figure 5:
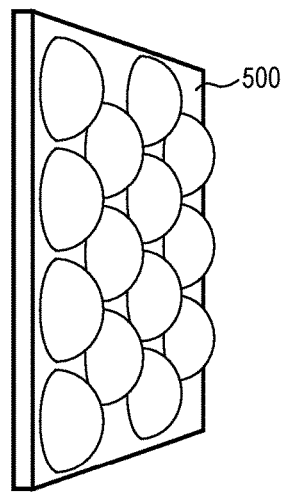
FIG. 5 shows a lens array of spherical lenses in the prior art.

It is possible to have an identification scheme wherein some of the coordinates are geometrical coordinates and some are not. For example, and without limitation, it is possible to have a multi-view display wherein each multi-view pixel emits beamlets in two horizontal rows identified just as "top row" and "bottom row" without any geometrical relationship known or implied between the rows. Such a display might be used, for example, to show different images to adults and children, as illustrated in FIG. 3. However, each row of beamlets might comprise a horizontal sequence of beamlets wherein the beamlets are regularly spaced for the purpose of showing different images to viewers that, for example, walk past the multi-view display, such that viewers see changing images as they walk by.

In such a display, one of the coordinates that identify beamlets might take one of the two possible values "top" or "bottom", while another coordinate might be a number identifying the beamlet in the horizontal beamlet sequence. Clearly, the first coordinate is not a geometrical coordinate, but the second coordinate is a geometrical coordinate. It will be possible to use the second coordinate to derive some relationships between pixels via mathematical techniques, but there will likely be some relationships that depend on the first coordinate for which a mathematical derivation is not possible.

The need for an identification scheme exists also for locations in the viewing space of a multi-view display. It is so because, when the operator of the multi-view display wants to specify locations where different images are to be viewable, it is necessary to have a scheme for the operator to identify those locations. The distinction between geometrical coordinates and non-geometrical coordinates has been discussed in the previous paragraphs for multi-view pixels and beamlets. Such a distinction also applies for the viewing space. For example, with a multi-view display used in a bookstore, viewing locations might be identified with names such as Fiction, SciFi, Travel, Humor, Cooking, etc. Clearly, such identifiers are non-geometrical coordinates. However, in other situations, it might be convenient to specify locations with two- or three-dimensional spatial coordinates which are, of course, intrinsically geometrical coordinates. In some cases, there might be a natural choice of geometrical coordinates. One such case is illustrated in the next figure.

Figure 13:
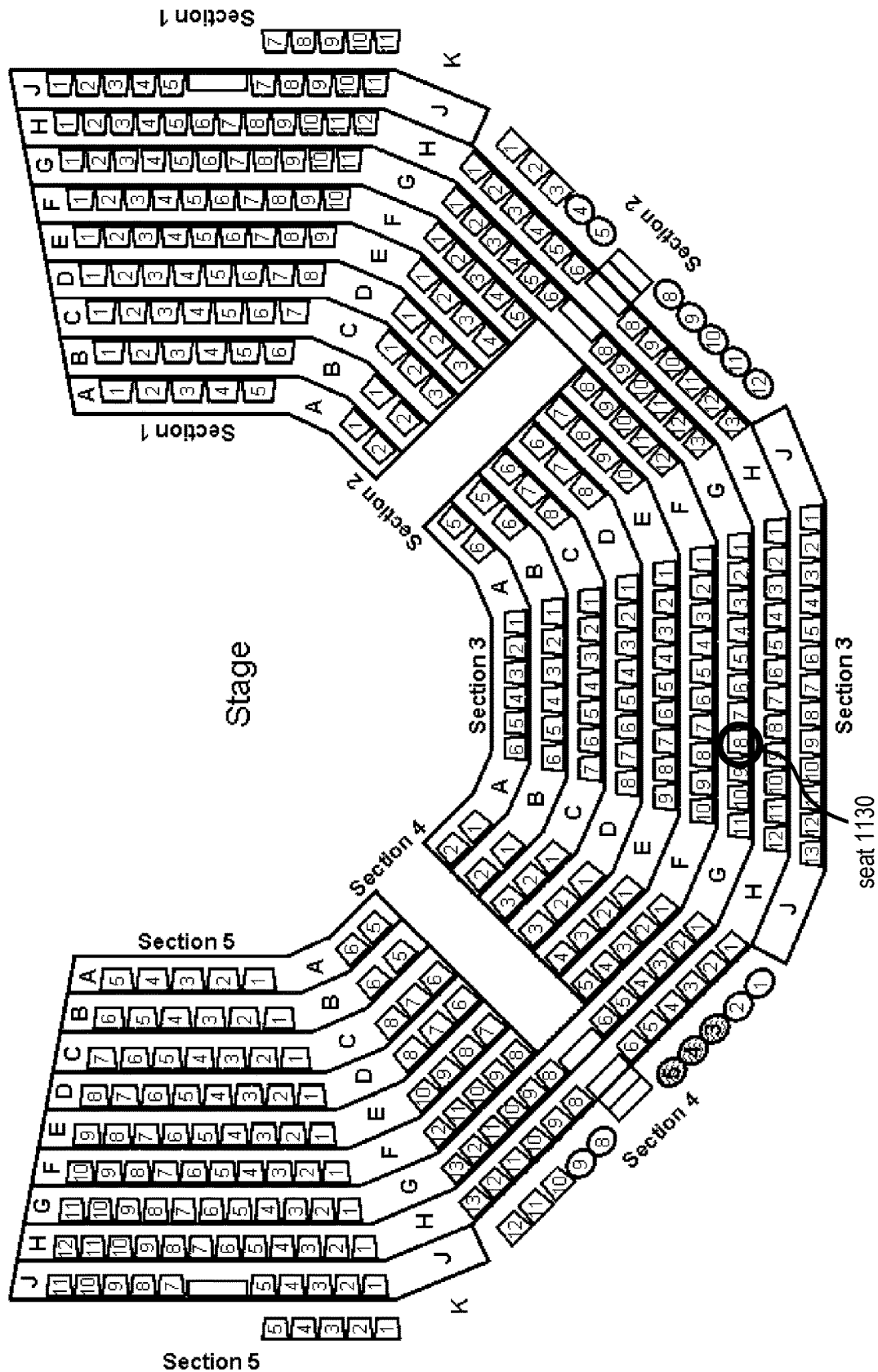
FIG. 13 shows a seating chart for a theater.

FIG. 13 shows a seating chart for a theater. The seats are subdivided into five sections and, within each section, individual seats are identified by a letter that specifies the row, and by a seat number within that row. Accordingly, a seat identifier might be a triplet like (3,G,8) wherein the first element of the triplet is the section number, the second element is the row letter, and the third element is the seat number. For example, the seat identified by the triplet (3,G,8) is labeled in FIG. 13 as seat 1130.

In the identification scheme presented in the previous paragraph the three elements of the triplet are three coordinates. Some of the three coordinates might be geometrical coordinates, others might not be. In particular, if no specific geometrical relationship between the five sections is present or known, the first coordinate, which denotes the section, must be regarded as a non-geometrical coordinate. However, within each section, there is a well-defined geometrical pattern of seats. Most of the seats are arranged as a geometrical array with well-defined geometrical parameters.

For the seats that are part of the geometrical pattern within a particular section, the second and third coordinates are geometrical coordinates. Even though the second coordinate is a letter, it is a geometrical coordinate because the letter is simply a proxy for a row number. It is common to use letters for row numbers in theaters in order to avoid confusion for the spectators, but each sequential letter simply replaces the corresponding number in the letter sequence and, as such, can be regarded as a geometrical coordinate, if the pattern of the seat array is well defined.

The fact that alphabetic letters in seat identifiers can be regarded as geometrical coordinates is well known. For example, spectators that are members of a group and want to sit near one another in a theater might request seats that have adjacent letter identifiers and have seat numbers that are close to one another. Such requests are often made by spectators because they know that those seats will be near one another.

Geometrical coordinates are advantageous because they allow the use of mathematical techniques through which one can extend known relationships and achieve estimates of unknown relationships. For example, for the theater of FIG. 13, it might be known that the beamlet identified as (9,5,7, 14) is visible at the seat identified as (3,G,8). As already noted, that beamlet originates from multi-view pixel 1150, which is identified by the coordinate pair (9,5).

The multi-view pixel identified by the coordinate pair (8,5) is, of course, adjacent to multi-view pixel 1150. If there is no knowledge of which beamlets from multi-view pixel (8,5) are visible at seat (3,G,8), an educated guess is, nonetheless possible. Most likely, multi-view pixel (8,5) is sufficiently similar to its neighbor, multi-view pixel (9,5), that the equivalent beamlet from pixel (8,5) might also be visible at seat (3,G,8). In other words, the beamlet that is visible at seat (3,G,8) from multi-view pixel (8,5) is likely to be beamlet (8,5,7,14) for which the last two coordinates have the same values as for beamlet (9,5,7,14).

The ability to derive estimates of relationships via mathematical techniques is very advantageous for simplifying calibration procedures. It is particularly advantageous if the positions and orientations of multi-view pixels, relative to one another, and relative to the multi-view display, are known with high precision. Such positions and orientations might be accurately determined when the multi-view display is manufactured. When the multi-view display is installed, its position and orientation relative to the desired viewing space might also be determined accurately in many cases. With such information available, mathematical techniques are available that are more advanced than the simple exemplary ones presented above. For example, and without limitation, it might be possible to exploit trigonometric functions and related formulas to achieve accurate estimates of relationships.

It will be clear to those skilled in the art, after reading this disclosure, how to employ mathematical techniques, such as the exemplary ones presented or named above, or other mathematical techniques, to estimate relationships between multi-view pixels, beamlets, and locations in the viewing space, wherein such relationships might be relationships between any number of entities selected from the group consisting of multi-view pixels, beamlets, and locations in the viewing space.

Although mathematical techniques make it possible to derive estimates of relationships, when coupled with accurate knowledge of positions and orientations, such estimates are not always possible or sufficient to enable a multi-view display to operate as desired. For example, if a multi-view display is installed in the theater of FIG. 13 with great accuracy at a position and orientation that is precisely known, relative to each of the five sections; if the positions and orientations of the multi-view pixels are known with great accuracy, relative to the multi-view display; and if the orientations of the beamlets are also known with great accuracy, relative to their associated multi-view pixels, then it might be possible to use just mathematical techniques to derive with great accuracy which beamlets are visible at which locations in the viewing space.

In practice, the level of accuracy required is difficult to achieve, if not impossible. Also, where geometrical coordinates are not available, mathematical techniques cannot provide a complete solution. Thus, field calibration of a multi-view display is expected to be advantageous. Embodiments of the present invention provide processes that greatly enhance the ease and effectiveness of field calibration of multi-view displays.

Figure 14:
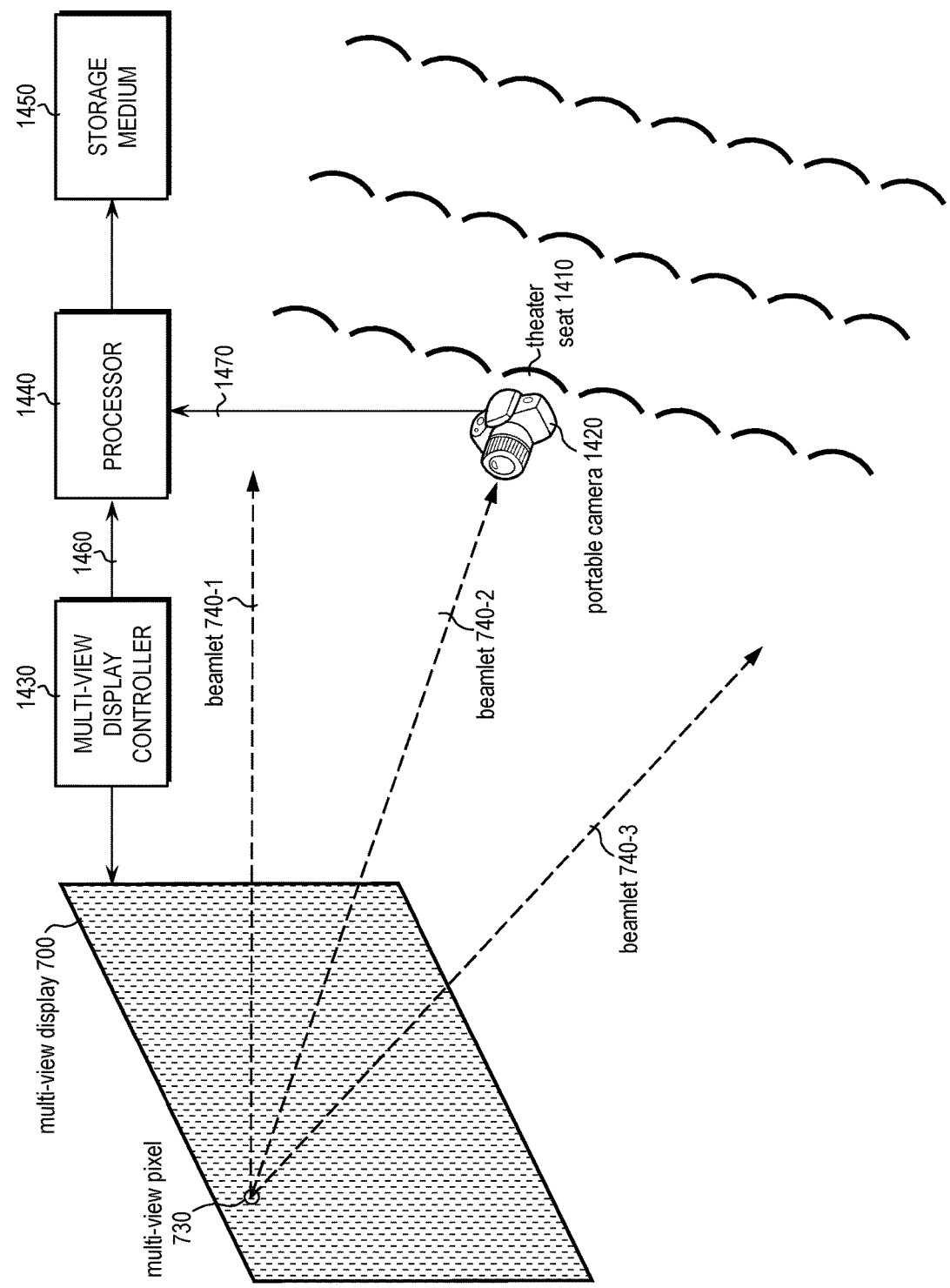
FIG. 14 depicts a scenario for calibration of beamlets in a theater via a camera.

FIG. 14 depicts a scenario wherein multi-view display 700 is used in a theater. The figure illustrates part of a calibration process in accordance with an illustrative embodiment of the present invention. The purpose of the calibration process is to calibrate the multi-view display. One of the objectives of the calibration process is to find out which beamlets are visible by a hypothetical theater customer sitting in theater seat 1410. To that end, a portable camera 1420 is placed near theater seat 1420 in the expected position where the eyes of the hypothetical theater customer will be. The portable camera is aimed at multi-view display 700.

In the scenario, beamlet 740-2 is visible by the hypothetical theater customer. In the theater, multi-view display 700 is controlled by multi-view display controller 1430, which also communicates with processor 1440 via communication link 1460. Processor 1440 receives information from multi-view display controller 1430 via communication link 1460, and also receives information from portable camera 1420 via communication link 1470. Processor 1440 is capable of processing the received information, and is capable of storing the results of the processing into storage medium 1450.

Figure 15:
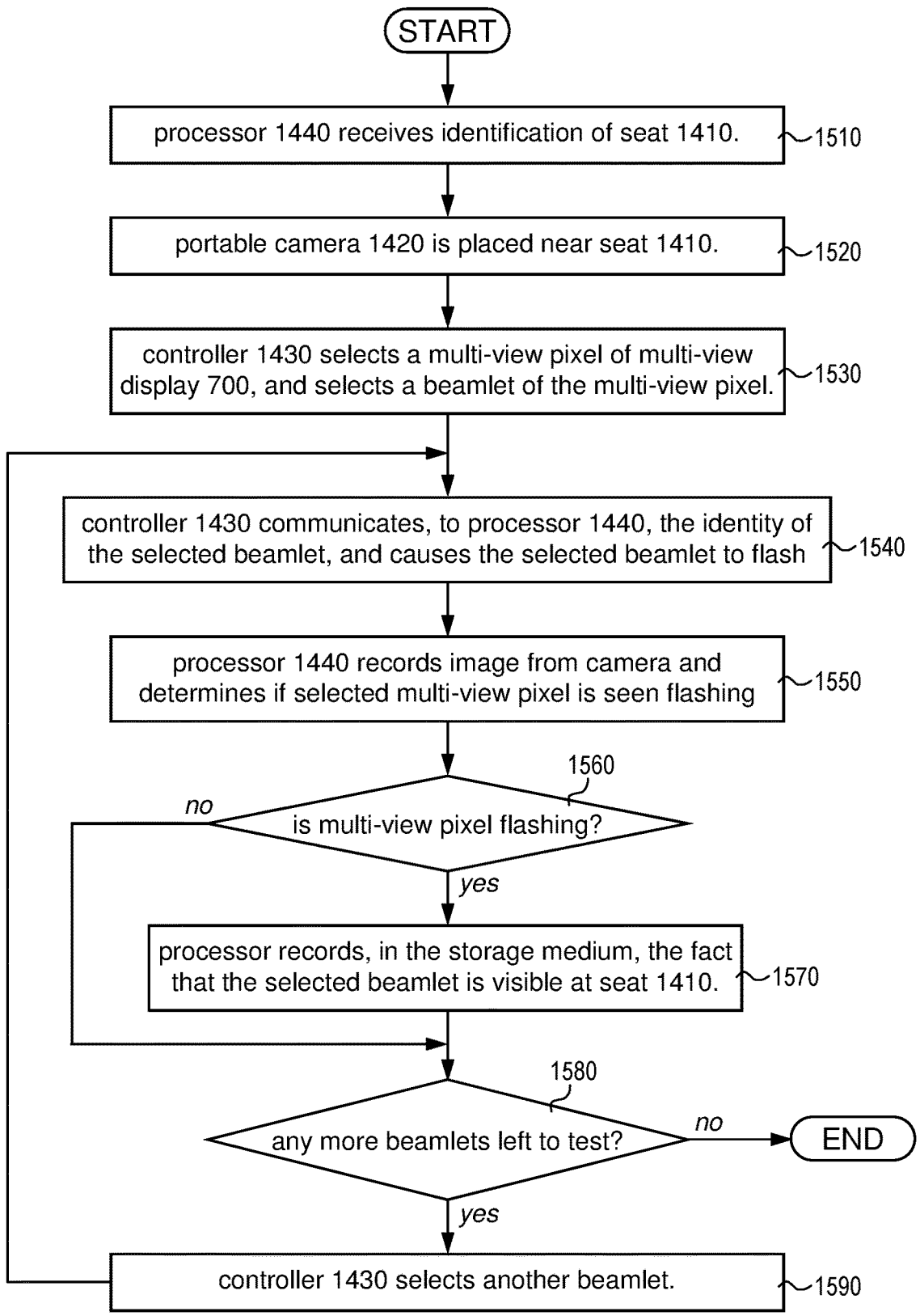
FIG. 15 is a flow diagram for part of a calibration process applicable to the scenario of FIG. 14.

FIG. 15 is a flow diagram 1500 of part of the calibration process in accordance with an illustrative embodiment of the present invention applicable to the scenario of FIG. 14.

In task 1510, the processor 1440 receives an identification of seat 1410. For example, the identification might be provided by a human operator via a keyboard connected to the processor, or via a portable wireless terminal, or by some other means.

In task 1520, the portable camera 1420 is placed near seat 1410. For example, the human operator might hold the portable camera by hand in a position near where the eyes of a theater customer would be, if the theater customer were sitting in seat 1420. The human operator aims the portable camera at the multi-view display.

In task 1530, the multi-view display controller 1430 selects a multi-view pixel of the multi-view display. For example, it selects multi-view pixel 730. The controller then selects a beamlet of the selected multi-view pixel. For example, it selects beamlet 740-1.

In task 1540, the controller communicates, to processor 1440, the identity of the selected beamlet. For example, the identity might be communicated via an identification that comprises four geometrical coordinates that uniquely identify the beamlet. The controller also causes the selected beamlet to flash on and off while all the other beamlets of the multi-view pixel, as well as all the other beamlets of all the other multi-view pixels, are maintained dark.

In task 1550, the processor collects, from the portable camera, one or more images recorded by the portable camera while the beamlet is flashing on and off. If the selected beamlet is visible by the portable camera, some of the images will have detected a bright spot in the place where multi-view pixel 730 is visible in the images; otherwise, all the images will show a dark multi-view pixel 730. The presence or absence of the bright spot in images collected when the beamlet is on is the desired outcome of task 1550.

In task 1560, the outcome of task 1550 is tested. If the flashing beamlet was not detected, it means that the beamlet is not visible from theater seat 1410. No further action is needed regarding this beamlet. However, if the flashing beamlet was detected, the processor performs task 1570, wherein the fact that the selected beamlet is visible from theater seat 1410 is recorded into storage medium 1450. For example, and without limitation, storage medium 1450 might be a disk drive, or a flash drive, or a flash module, or RAM, or tape, or optical storage, or any other storage medium capable of storing such information. In the example made above, beamlet 740-1 was selected, and FIG. 14 shows that this beamlet is not visible at theater seat 1410. Therefore, no flashing is detected, and task 1570 is skipped.

In task 1580, a test is performed to determine if there are beamlets remaining that have not yet been selected for flashing on and off. There might be beamlets remaining in multi-view pixel 730, or there might be beamlets remaining in other multi-view pixels. If no beamlets remain, there is nothing left to do. Otherwise, one of the remaining beamlets is selected. For example, beamlet 740-2 remains to be flashed on and off, and is selected next after beamlet 740-1.

If a beamlet is selected among the remaining beamlets, the flow proceeds to perform, again, task 1540. In this example, with beamlet 740-2 selected, when task 1550 is performed again, multi-view pixel 730 is detected as a flashing bright spot in the images recorded by the portable camera. Therefore, task 1570 is executed, and the fact that beamlet 740-2 is visible from theater seat 1410 is recorded in the storage medium.

When flow diagram 1500 reaches the end, all beamlets in all multi-view pixels of multi-view display 700 will have been examined by turning them on and off. Storage medium 1450 will then contain a complete list of all the beamlets visible from theater seat 1420. The sequence of tasks can then be repeated for another theater seat, until all theater seats are visited. At that point, storage medium 1450 will contain a complete set of lists of all beamlets visible from each seat in the theater. Thereafter, the theater can use the multi-view display for showing different images to different theater customers seated in different seats. To do so, for each seat, the corresponding list in storage medium 1450 is queried, and the beamlets in that list are configured to display the pixels of the associated image. This is also described in greater detail below.

It is possible that some beamlets might appear in multiple lists for different seats. Generally, when that happens, it is because the position of the head of one potential theater customer is in the path of the beamlet, as seen by another potential theater customer. In such a situation, it is advantageous for the theater to have a means of detecting which seats are occupied and which seats are unoccupied. For example, if a seat is occupied but the seat in front is unoccupied, there might be beamlets visible from the occupied seat whose path would otherwise have been blocked by the head of an occupant of the unoccupied seat. In such a situation, if the multi-view display controller knows which seats are unoccupied, it can simply ignore the beamlet lists for the unoccupied seats.

The functionality of multi-view display controller 1430 has been described, so far, mostly in the context of calibrating the multi-view display. After calibration, as part of normal operation, the controller manages the implementation of the multi-view functionality. For example, and without limitation, a multi-view display might be used in a theater for the purpose of displaying subtitles, and different viewers might want to see subtitles in different languages. In this example, the multi-view display might comprise a plurality of multi-view pixels in the shapes of segments arranged for displaying alphanumeric characters. Such displays are known in the art as segment displays.

In accordance with the current example, if the viewer in seat H11 has elected to see subtitles in French, the multi-view display controller might receive a text string in French and a command to display that text string for seat H11. To do so, the controller would then query storage medium 1450 to get the list of beamlets that are visible from seat H11. The querying might occur via processor 1440 as an intermediary, or directly through a direct communication link.

The desired list of beamlets might or might not be available in storage medium 1450. If not, the controller can take advantage of the fact that the identification of seat H11 is a form of geometrical coordinates, and can query storage medium 1450 for lists of beamlets that are visible from one or more seats in the vicinity of seat H11. The controller can then use mathematical techniques to derive the desired list for seat H11 from the available lists for the neighboring seats. The controller might also use mathematical techniques to derive visibility information for beamlets not included in the available lists. Eventually, the controller achieves a comprehensive list of all the beamlets from all the multi-view pixels that are visible from seat H11.11. H With such a list available, the controller might then decide to obtain information about occupancy of one or more seats that are in front of seat H11. For example, in seating chart 1300, such seats might include seats G10 and G11. If one or both of those seats is occupied, the controller can, again, take advantage of the geometrical coordinates and can compute a list of beamlets that, although visible from seat H11, are likely to be blocked from view by the presence of the occupants of seats G10 and G11. Such beamlets are likely to be visible by those occupants. If those occupants have also elected to see subtitles in French, no particular action is needed; but, if those occupants have elected to see subtitles in a different language, the controller must decide whether those likely-to-be-blocked beamlets should be used for displaying subtitles for the viewer in H11, or for the viewers in G10 and G11. Again, geometry and mathematical techniques can be used, in conjunction with models of beamlet blockage by seat occupants, to achieve an optimal assignment of beamlets to viewers.

Eventually, multi-view display controller 1430 generates a list of beamlets that are visible by the viewer in H11 and not blocked by other viewers or other obstacles. Then, the controller converts the French text to be displayed into a pattern of segments to be turned on or off, in well-know fashion. Each segment to be turned on or off corresponds to a segment-shaped multi-view pixel in the multi-view display. For each such multi-view pixel, if there is a beamlet originating from that multi-view pixel that appears in the list of visible not-blocked beamlets for seat H11, the controller commands the multi-view display to turn hat beamlet on or off, as prescribed by the pattern of segments to be displayed.

The result of the above operations is that the viewer in seat H11 sees a pattern of bright or dark segments on the display surface of the multi-view display, and that pattern forms the desired French subtitle.11 and are not blocked by other viewers or Referring back to FIG. 14, it will be clear to those skilled in the art, after reading this disclosure, that the functionality of portable camera 1420 can also be performed by other types of light detector, besides a camera, as long as the light detector has sufficient sensitivity for detecting the on-off flashing of multi-view pixel 730, when beamlet 740-2 is turned on and off.

The illustrative calibration process described in the previous paragraphs is effective at generating the desired lists of beamlets for storage in storage medium 1450; however, other embodiments of the present invention are possible wherein the calibration process is faster. In particular, when portable camera 1420 is aimed at multi-view display 700, the portable camera can record an image of more than just multi-view pixel 730. Generally, the image also records other multi-view pixels. Possibly, the entire multi-view display might be imaged. If beamlets of other multi-view pixels, besides multi-view pixel 730, are flashed on and off simultaneously with beamlets of multi-view pixel 730, the portable camera might be able to resolve them individually, as long as the portable camera has sufficient resolution.

In such other embodiments, multi-view display controller 1430 might communicate, to the processor, a list of all the beamlets that are being flashed on and off simultaneously in different multi-view pixels. The processor can then employ well-known image processing techniques to identify, in the images recorded by the portable camera, which ones of the multi-view pixels are flashing on and off. For those multi-view pixels, the processor then can record, in the storage medium, the fact that the beamlets being flashed are visible at seat 1410.

If geometrical coordinates are available for the identification of beamlets and/or multi-view pixels, the processor might be able to generate estimates of beamlets visible from seat 1410 even for some multi-view pixels whose beamlets have not been flashed on and off. Depending on the accuracy with which the relative positions and orientations of beamlets and multi-view pixels are known, those estimates might be sufficiently accurate for storing into storage medium 1450 without further processing. Otherwise, the estimates can be used to improve the speed of flow diagram 1500 by restricting the range of beamlets that are selected only to beamlets that are estimated to be visible from theater seats being characterized.

Although FIG. 14 depicts only one portable camera 1410, it will be clear to those skilled in the art, after reading this disclosure, how to make and use embodiments of the present invention wherein multiple portable cameras are used simultaneously for characterizing multiple theater seats simultaneously. In such embodiments, the processor might receive information from all the portable cameras via multiple communication links equivalent to communication link 1470.

Although processor 1440 is depicted in FIG. 14 as a single processor, it will be clear to those skilled in the art, after reading this disclosure, how to make and use embodiments of the present invention wherein the functionality of processor 1440 is implemented differently, for example, and without limitation, the processor might be implemented via multiple processors, or via one or more virtual processors, or via cloud processing, or via other suitable processing techniques known in the art, to name just a few possibilities.

FIG. 14 depicts communication link 1460 for communicating, to the processor, the identity of beamlets that are being flashed on and off. The communication link is depicted as a separate and independent communication link. However, it will be clear to those skilled in the art, after reading this disclosure, how to make and use embodiments of the present invention wherein the communication link is implemented in other ways. For example, and without limitation, the communication link might be implemented via the on-off pattern of flashing of the selected beamlet. In such embodiments, in task 1540, the identity of the second beamlet might be communicated to processor 1440, for example, and without limitation, by causing the selected beamlet to flash in a pattern that is unique to the selected beamlet.

When the processor detects on-off flashing in the images recorded by the portable camera, it can examine the pattern of flashes and decode it to obtain any information contained therein through techniques well-known in the art. For example, the pattern of flashes might be a non-return-to-zero (NRZ) digital sequence of amplitude-shift-keyed (ASK) bits. The multi-view display controller can control the pattern of flashes and encode into it any information that needs to be communicated to the processor, including, for example, an identification of the beamlet.

The ability to communicate beamlet identification and other information via patterns of beamlet flashes is advantageous in many embodiments of the present invention. In some such embodiments, it is possible to simultaneously flash on and off multiple beamlets of the same multi-view pixel. Each beamlet can flash with a unique pattern, different from the other beamlets. Only beamlets visible by the portable camera are detected by the portable camera, and the patterns of flashes enable the identification of the beamlets being detected. Patterns of flashes are known in the art that are suitable for such identification; for example, and without limitation, so called Gray-code patterns can be used. Some such patterns are presented in U.S. Pat. No. 7,001,023. Other patterns known in the art might also be suitable, such as, for example, maximal-length sequences and other shift-register sequences. Some types of patterns make it possible to identify beamlets even in situations wherein more than one beamlet from a particular multi-view pixel is visible by the portable camera.

In flow diagram 1500, in task 1510, the processor 1140 receives an identification of seat 1410. The flow diagram does not specify where the identification comes from or how it is generated. As mentioned above, the identification might be provided by a human operator. More generally, embodiments of the present invention are possible for use also in environments other than a theater. In such environments, in the equivalent task to task 1510, a processor receives an identification of a viewing location in the viewing space of a multi-view display. The identification might, again, be provided by a human operator; however, other possibilities exist. For example, and without limitation, the portable camera might be equipped with a localization capability for estimating its own location. It is common for so-called smartphones to incorporate a camera and a localization capability. When a picture is taken via a smartphone camera, the location of where the picture is taken is commonly included in the data file that stores the picture. In task 1550, when the processor collects images from the portable camera, those images might comprise information about where the portable camera was at the time when the image was recorded by the portable camera.

If the portable camera is equipped with a localization capability, such capability needs to be sufficiently accurate for the goals of the multi-view display. For example, in the scenario of FIG. 14, the localization capability might need to be accurate enough to discern if the portable camera is located in the center of a seat, as opposed to in-between two seats. Many localization techniques are known in the art to achieve the desired accuracy. For example, and without limitation, an ultrasound-based system might be used wherein ultrasonic devices are placed at reference points in the theater, such that the portable camera can estimate its own position relative to the reference points based on ultrasonic signals. In such a situation, it is necessary to convert the location determined via the localization capability into a theater-seat identification. Generally, the location estimate provided by the localization capability is based on geometrical coordinates. As already noted, theater-seat numbers are also a form of geometrical coordinates, and it is well known in the art how to use mathematical techniques for converting one type of geometrical coordinates into another type.

Figure 16:
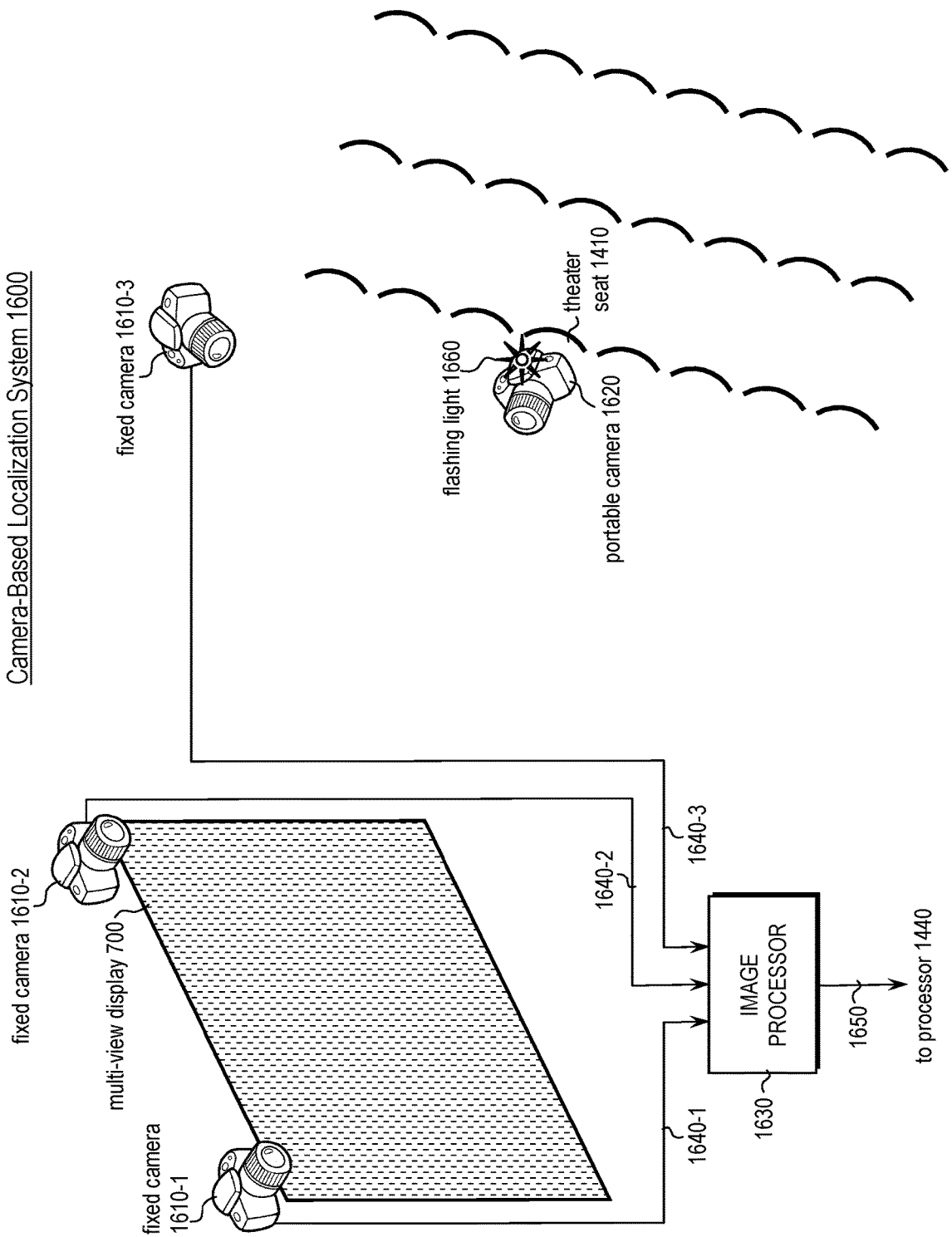
FIG. 16 depicts a camera-based localization system.

FIG. 16 depicts a localization system 1600 for locating a portable camera 1620 in the theater. The system is based on three fixed cameras 1610-1, 1610-2, and 1610-3 which are at fixed locations within the theater. The locations are chosen such that the desired viewing space of multi-view display 700 is visible by sufficiently many fixed cameras and with sufficient clarity that the position of portable camera 1620 can be accurately reconstructed via image processing. The three fixed cameras record images of the viewing space and transmit the images to an image processor 1630 via communication links 1640-1, 1640-2, and 1640-3, respectively. The image processor processes the images to generate an estimate of the location of portable camera 1620; the location estimate is communicated to processor 1440 via communication link 1650.

In the localization system of FIG. 16, the portable camera 1620 is equipped with a flashing light 1660. The flashing light makes it easier for the image processor to locate the portable camera 1620 in the images recorded by the three fixed cameras. Furthermore, the flashing light can also provide a communication link between the portable camera 1620 and the image processor. For example, and without limitation, the flashing light can flash in a pattern of flashes that communicates information about its identity, its status, its current activity, or any other information that might be useful to communicate; the portable camera 1620 might thus, for example, indicate when it is ready to start recording images at a particular location; such information might be decoded by the image processor. The image processor could also relay such information to either the processor 1440, or to the multi-view display controller 1430 which could, then, initiate the flashing of beamlets.

Although FIG. 16 shows multiple fixed cameras for achieving the localization functionality, it will be clear to those skilled in the art, after reading this disclosure, how to make and use embodiments of the present invention wherein more or fewer fixed cameras are used. In particular, the two fixed cameras 1610-1 and 1610-2 are depicted in FIG. 16 as being mounted near multi-view display 700. Those two fixed cameras might be affixed to the multi-view display when it is manufactured, and the geometrical relationship between the position and orientation of the two fixed cameras, relative to the multi-view display, might be characterized in the factory, before the multi-view display is shipped. Then, after the multi-view display is installed in the theater, the two cameras can be used to identify locations in the viewing space, relative to the multi-view display, without the need for field calibration of the two fixed cameras. Additional fixed cameras, such as fixed camera 1610-3, can be used, if necessary, to improve localization accuracy.

The two fixed cameras 1610-1 and 1610-2 can be sufficient for accurate localization because the two images can be combined, in known fashion, through the technique known as stereo photography. Such technique can be employed by the image processor to derive depth information; i.e., to calculate the position of portable camera 1620 in three dimensions including the dimension of distance from the multi-view display to the camera. Such distance dimension is commonly referred to as "depth". Camera systems that comprise multiple cameras for implementing stereo photography are often referred to as stereoscopic cameras, and the multiple cameras can be individual stand-alone cameras, as depicted in FIG. 16, or can be cameras housed together in a single unit.

Other camera-based techniques, besides stereo photography, are known in the art for depth measurement. It will be clear to those skilled in the art, after reading this disclosure, how to make and use embodiments of the present invention wherein other types of depth-aware cameras, or other image-capturing devices or systems, or other localization systems are used. For example, and without limitation, time-of-flight cameras, structured light scanners, global positioning systems, indoor positioning systems, and/or altimeters might be used, to name just a few.

In FIG. 16, the localization system comprises multiple fixed cameras. However, embodiments of the present invention are also possible wherein a single non-depth-aware fixed camera is used for location determination. In situations where the environment provides other clues for location identification, a single non-depth-aware fixed camera might be sufficient. For example, in the theater, the images recorded by a fixed camera located near the multi-view display and aimed at the seats are expected to clearly show the seats themselves. The image processor might then be able to identify, from such images, the seat where portable camera 1620 is placed, without requiring depth information. Many other such situations exist wherein a simple two-dimensional image might suffice to identify the position of portable camera 1620 via using other available information. For example, and without limitation, if the actual physical dimensions of the portable camera 1620 are known to the image processor, the apparent size of portable camera 1620 in recorded images provides a clue to its distance from the fixed camera.

The localization system 1600 depicted in FIG. 16 is capable of three-dimensional localization: through the use of multiple fixed cameras, it can estimate a full set of three geometrical coordinates for the position of portable camera 1620. However, a more limited localization system that is only capable of two-dimensional localization can also be effective in many embodiments of the present invention. For example, and without limitation, if only the one fixed camera 1610-1 is available in the theater depicted in FIG. 16, the view from that camera might still be wide enough to cover all the seats in the theater. When the portable camera 1620 is placed near a particular seat, the image recorded by fixed camera 1610-1 is still sufficient to identify the seat where the portable camera has been placed, and that seat identification can be communicated to processor 1440 for completing the calibration task as in the case where three-dimensional localization was available.

The reason why two-dimensional localization is sufficient, in the example of the previous paragraph, is that the viewing space of interest is intrinsically two-dimensional. For this reason, the two-dimensional image recorded by a properly-placed conventional camera, can be sufficient to discriminate between locations in the viewing space and can provide an adequate identification of the locations of interest.

The reasoning can be further extended to situations wherein the viewing space is one-dimensional. For example, and without limitation, a multi-view display intended for viewers that walk through a long corridor might be configured for displaying different images to different locations along the corridor. A localization system for such a multi-view display might be implemented with a so-called rolling-wheel measuring device that simply measures the one-dimensional distance from the beginning of the corridor.

Although the fixed and portable cameras in FIGS. 14 and 16 are depicted as conventional cameras, it will be clear to those skilled in the art, after reading this disclosure, that a variety of alternative image-capturing devices exist that could perform the functions of those cameras as disclosed herein. For example, and without limitation, portable cameras 1420 and 1620, could be so-called smartphones or tablets with a built-in camera. Such devices might be convenient because, in addition to the camera, they also provide other advantageous functionalities such as data processing, wireless communications, human interfaces, a light source, and a lighted display, to name just a few. For example, flashing light 1660 might be implemented via the light source provided in many such devices for flash photography; and the lighted display could be used to display a pattern that can be detected in the images recorded by the fixed cameras. Such detected pattern might be used as an aid for depth estimation, and both the pattern and the flashing light could be used for communicating information to the image processor. The image processor could then relay such information to any appropriate destination.

Although FIG. 16 depicts portable camera 1620 as having a flashing light, alternative embodiments of the present invention are possible wherein portable camera 1620 does not have a flashing light. For example, and without limitation, if the environment is well-lit and the portable camera 1620 is easily identifiable in images recorded by the fixed cameras, the flashing light might not be needed.

Other alternative embodiments are also possible wherein the flashing light is used by itself, in place of portable camera 1620, without a portable camera attached to it. In particular, for example, and without limitation, it was noted above that the two fixed cameras 1610-1 and 1610-2 might be affixed to the multi-view display when it is manufactured, and that the geometrical relationship between the position and orientation of the two fixed cameras, relative to the multi-view display, might be characterized in the factory, before the multi-view display is shipped. Additionally, in the factory, the geometry of multi-view pixels and beamlets, relative to the two fixed cameras, might be characterized before the multi-view display is shipped. Such characterization might accompany the multi-view display as part of the shipment as, for example, a printed document or, better, as a computer-readable medium. In such a situation, the pair of fixed cameras can be used in the theater to estimate the position of the flashing light, relative to the multi-view display, via stereo photography. Thereafter, a list of beamlets visible from the position of the flashing light can be extracted from the characterization that accompanies the multi-view display.

Although portable camera 1420 is characterized by the adjective "portable", it will be clear to those skilled in the art, after reading this disclosure, how to make and use embodiments of the present invention where one or more portable cameras 1420 might be permanently affixed to some locations where it is desired to perform a calibration repeatedly.

FIGS. 14 and 16 depict several communication links, and the previous paragraphs present various exemplary implementations of such communication links. However, it will be clear to those skilled in the art, after reading this disclosure, how to make and use embodiments of the present invention wherein such communication links, as well as other communication links not explicitly presented in this disclosure, are implemented in other ways. For example, and without limitation, a communication link can be implemented via wireless or wired techniques, using radio waves, acoustic signals, ultrasounds, light signals, optic fibers, co-axial cables, wire pairs, LAN cabling, etc., to name just a few. Also, a communication link might be implemented as a direct connection, or as an indirect connection wherein an intermediate entity relays the information. Possibly, the intermediate entity might modify the relayed information, if appropriate. A communication link might also be as simple as an electrical or optical connection between subsystems inside a single unit, or even inside a single integrated circuit.

A communication link might also be implemented via information storage; for example, and without limitation, a task might communicate information to another task by storing the information into a storage medium for later retrieval by the other task.

It was noted above that some embodiments of the present invention might use a light detector other than a camera to perform the functionality of one or both of portable cameras 1420 and 1620. Such light detector might be implemented as a light detector proper—i.e., a device that generates a signal responsive to incident light—or also as a reflecting element coupled to another light detector. For example, the reflecting element might be a mirror, or an arrangement of mirrors, or a so-called retroreflector, or some other reflecting element.

A retroreflector is a device or surface that reflects light back toward its source with low scattering and an amount of divergence that depends on how the retroreflector is made. For example, and without limitation, in FIG. 16, a retroreflector might be used in place of portable camera 1620. The light from beamlets striking the retroreflector would then be reflected back toward the multi-view display 700 and, with an appropriate amount of divergence, the reflected light could be received by either or both of fixed cameras 1610-1 and 1610-2.

Such an implementation of a light-detector for use in place of the portable camera 1620 might be advantageous, for example, in situations where a calibration of the multi-view display must be performed very frequently. For example, it is common, in some meeting rooms, to have an electronic display mounted on a movable cart. If multi-view display 700 is on a movable cart in such a room, a calibration of the multi-view display is likely to be necessary whenever the display cart is moved, especially if the seats are also movable. In such a situation, one might affix a retroreflector to each seat in the room. A calibration can then be performed whenever the multi-view display, or one or more of the seats, are moved. For example, the flow diagram of FIG. 15 can be performed, or an equivalent set of tasks can be performed, as taught in this disclosure.

For such calibrations, the two fixed cameras 1610-1 and 1610-2, in conjunction with the retroreflectors, perform the function of portable camera 1620. However, the two fixed cameras can also perform the localization function via stereo photography, as taught above. Indeed, the calibration might be also performed in accordance with the alternative method taught above wherein portable camera 1620 is not used and only the flashing light is used. The retroreflectors can perform the function of the flashing light by reflecting light from the multi-view display itself or from an auxiliary light source positioned near the multi-view display. An auxiliary light source might be advantageous because it can be made brighter than the multi-view display. The auxiliary light source might be caused to flash in a particular flashing pattern that makes it easy, for the fixed cameras, to detect reflections from the retroreflectors.

In this disclosure, several tasks and variants thereof are taught. Such tasks can be combined in a variety of ways into embodiments of the present invention. In particular, FIG. 15 presents a flow diagram that might be performed as part of some embodiments of the present invention. In the flow diagram, as well as in other parts of this disclosure, tasks are presented in sequence; however, many of the presented tasks can be performed in many other equivalent sequences. For example, and without limitation, in the flow diagram of FIG. 15, tasks 1510, 1520, and 1530 can be performed in any order without affecting the effectiveness of the calibration. It is so because the effects of any one of those three tasks are not a prerequisite for the other two tasks.

It will be clear to those skilled in the art, after reading this disclosure, where, in this disclosure, the sequential order of tasks can be changed without affecting the final outcome. In the claims that accompany this disclosure, unless explicitly stated otherwise, it should be understood that any claimed tasks can be performed in any order, except where the results of one task are a prerequisite for another task.

In accordance with some exemplary embodiments of the present invention, a multi-view display controller might be configured to cause the multi-view display to continuously display patterns of flashes such as, for example, the Gray-code patterns mentioned above. As already mentioned, such patterns can be configured to communicate all the necessary information for identifying beamlets and multi-view pixels without the need for a separate communication link to the portable camera.

The portable camera can also configure its flashing light 1660 such that the pattern of flashes emitted by the flashing light provides a communication link with the fixed cameras. That communication link can be used, for example, to synchronize a clock of the portable camera with clocks of the fixed cameras. Many other ways of achieving clock synchronization are also known in the art and could be used in these exemplary embodiments.

With synchronized clocks, the portable camera and the fixed cameras can now each record a sequence of images wherein all images are tagged with the time when the images are recorded. No processing of the images or additional communication links are needed at the time when the images are being recorded. Each camera simply records a sequence of time-tagged images while a human operator carries the portable camera from location to location where calibration is desired in the viewing space. The human operator must only make sure to keep the portable camera in each location long enough for all the cameras to record a sufficient number of images, as they continually record the sequence of time-tagged images.

The necessary processing of the images can occur in non-real time. The recorded image sequences from all cameras can be provided to a processor that uses the time tags for reconstructing the synchronization of all the images from all the cameras. The processor can then estimate the locations of the portable camera at different times by processing the images recorded by the fixed cameras. The processor can also process the images recorded by the portable camera at those times to identify beamlets visible from those locations.

One of the advantages of non-real-time processing is that clock synchronization between the cameras can be performed at any time, even after the images are recorded. If clocks are sufficiently accurate, clock synchronization can be effective even hours or days after the recording of the image sequences.

The position of the portable camera can be continuously identified through the images recorded by the fixed cameras even while the portable camera is moving. Embodiments of the present invention are, then, possible wherein the portable camera is allowed to continuously move from location to location without ever having to stop. In such embodiments, mathematical techniques such as those listed above can be used, in well-known fashion, to generate the desired lists of beamlets at the desired locations from images recorded by the cameras while the portable camera is moving.

FIGS. 14 and 16 depict certain communication links between some of the depicted entities; however, it will be clear to those skilled in the art, after reading this disclosure, how to make and use embodiments of the present invention which comprise other communication links in addition to, or instead of some or all of the communication links depicted in the figures. Embodiments of the present invention can accomplish the desired results through communications between various entities that might be implemented differently. For example, and without limitation, the tasks of the flow diagram of FIG. 15, and variants thereof, might be coordinated by processor 1440. The processor, then, might use a communication link to communicate with the multi-view display controller for the purpose of commanding the flashing of selected beamlets. The processor might also use a communication link to command a portable camera to take a picture, or to command a flashing light 1660, if present, to flash in a particular pattern, or to communicate instructions or information for the use of a human operator, if the portable camera is equipped with a suitable human-user interface. The portable cameras 1420 and 1620 might also communicate directly with the multi-view display controller for the purpose of performing certain tasks.

Although FIGS. 14 and 16 depict processor 1440, storage medium 1450, portable camera 1420, portable camera 1620, and image processor 1630 as separate entities, it will be clear to those skilled in the art, after reading this disclosure, how to make and use embodiments of the present invention wherein some or all of those functions are performed by the same device. In particular, modern portable devices such as smartphones, tablets, portable computers and many other similar devices, comprise ample built-in storage media and powerful processing capabilities, including image processing. Embodiments of the present invention are possible, for example, wherein one such portable device might be used to perform multiple functions. Possibly, all or most of the functions depicted in the figures might be performed by a single portable device. Alternatively, some functions might be performed, for example, and without limitation, via so-called "cloud" computing or virtual processors or virtual machines, to mention just a few of the available possibilities.

Some implementations of multi-view displays can have a very large number of multi-view pixels. The lens 830 is likely to be a costly component of such multi-view pixels, and the desire to achieve low cost might mean that the lens cannot be an achromatic lens, with the consequence that the color of a beamlet will affect the shape and size of the beamlet. Calibration in accordance with some embodiments of the present invention can be effective at compensating for such chromatic aberration. In such embodiments, it might be necessary to perform separate calibrations for different colors.

Light emission by beamlets or other light sources is often characterized in this disclosure with qualifiers such as "on-off" or "flashing". Also, the detection of light might be characterized as detecting presence or absence of light or light change, or as detecting an "on-off" or "flashing" patterns. However, it is to be understood that light from a light source possesses a plurality of characteristics such as, for example, and without limitation, brightness, color, spectral composition, polarization, beam shape, beam profile, spatial coherence, temporal coherence, etc., to name just a few. For the purposes of this disclosure, qualifiers such as "on-off" or "flashing" or other qualifiers that relate to a change in emitted or detected light, are to be understood to comprise any change in any of the characteristics of such light. Furthermore, although the use of the "on-off" qualifier might be interpreted as implying a full swing in the value of parameters such as brightness, for the purposes of this disclosure, such qualifier and others that relate to changes in the light are to be understood, instead, to also, possibly refer to partial changes in the brightness or other parameter. Such partial changes might be referred to in the art as "proportional" or "smooth" or "analog" changes.

It is to be understood that this disclosure teaches just one or more examples of one or more illustrative embodiments, and that many variations of the invention can easily be devised by those skilled in the art after reading this disclosure, and that the scope of the present invention is defined by the claims accompanying this disclosure.

Definitions

Beamlet—For the purposes of this disclosure, a "beamlet" is defined as an elemental entity of light emitted by a multi-view pixel in a multi-view display. The word does not appear in standard dictionaries. It has been created herein for the purposes of this disclosure and related discussions.

In some implementations of multi-view pixels, a multi-view pixel resembles a conventional image projector. A conventional image projector projects a plurality of narrow light beams toward a projection screen. Each light beam resembles the beam of light emitted by a searchlight or by a lighthouse. With a conventional projector, there is one such beam for each projected pixel. Because of the large number and typically small size of such beams the word "beamlet" has been created to refer to one of them A multi-view pixel is similar to an image projector in that it emits a number of beamlets, but the beamlets are not intended for forming an image on a screen. Rather, they are intended to fall upon the eyes of a viewer. Generally, the intended viewer is human, but optical devices such as cameras can also be used with a multi-view display, and it is possible to envision applications of multi-view displays wherein intended viewers might be non-human viewers such as animals, cameras or other image-capturing entities.

In a multi-view pixel, each beamlet's light can be controlled independently of the light of other beamlets. For example, and without limitation, the light intensity and/or color of an individual beamlet might be controllable independently of the intensity and/or color of the light of other beamlets. Other parameters of beamlet light might also be controlled, such other parameters comprise, for example, spectral composition, polarization, beamlet shape, beamlet profile, overlap with other beamlets, focus, spatial coherence, temporal coherence, etc., to name just a few.

A viewer that looks at a multi-view pixel sees the light of one or more beamlets; in particular, the viewer sees the light of those beamlets that are emitted by the multi-view pixel and fall upon a viewer's pupil. The viewer perceives the multi-view pixel as glowing with the combined light of those beamlets. As with conventional pixels, a multi-view pixel can have a variety of shapes, as perceived by the viewer that looks at the multi-view pixel.

Display—For the purposes of this disclosure, a "display" is defined as an electronic device able to generate visible images. In particular, a display accepts an image specification in the form of an electrical signal that might be digital or analog, and generates a visible image in accordance with the specification. The image is visible, by viewers of the display, on a physical element referred to as the "display surface".

Typically the display surface comprises a collection of pixels that form the visible image. In some displays the display surface is part of the display itself. Examples of such displays include TV sets, computer monitor, and digital desktop clocks, etc., to name just a few. In other displays, such as, for example, image projectors, the display surface might not be part of the display proper.

In some projectors, the display surface might not be, strictly speaking, a surface. For example, a display can be created by mounting a plurality of pixels on the façade of a building, or on some other architectural structure that might not be shaped exactly as a surface. For the purposes of this disclosure, the term "display surface" shall be understood to comprise such structures as well.

Multi-View Display—For the purposes of this disclosure, a "multi-view display" is defined as a display able to show different images to different viewers. Based on the position of the viewer relative to the multi-view display, each viewer sees a different image while looking at the display surface of the multi-view display, and does not see the images seen by other viewers. This is in contrast to conventional displays, which show the same image to all viewers regardless of where the viewers are positioned relative to the display. In a multi-view display an image is formed as a collection of pixels that comprises multi-view pixels.

Multi-View Pixel—For the purposes of this disclosure, a "multi-view pixel" is defined as "the smallest image-forming unit of a multi-view display"; as such, the comments made in the definition of the word "pixel" also apply for a "multi-view pixel".

A multi-view pixel is a more flexible version of the type of pixel used in conventional (non-multi-view displays). In a typical conventional display, pixels emit light in response to electrical excitation, and the brightness of a pixel depends on the extent of excitation. Each conventional pixel emits light in all directions, such that all viewers perceive the pixels the same way, regardless of viewer position.

A multi-view pixel, instead, can control not just the brightness, but also the spatial distribution of emitted light. In particular, a multi-view pixel can be commanded, for example, to emit light in certain directions but not others; or it can be commanded to independently adjust the brightness of light emitted in different directions. Other parameters of emitted light can also be adjusted independently for different directions of emission.

Pixel—The word "pixel" is well-known in the art in conjunction with images and image processing. It is a contraction of "picture element" and is defined by the American Heritage dictionary, third edition, as "the smallest image-forming unit of a video display". For the purposes of this specification, this definition is broadened to apply to any type of display, and not just video displays. For example, and without limitation, this definition applies to so-called segment displays, wherein images of numbers or other characters are formed as a collection pixels shaped as segments. So-called seven-segment displays are common for displaying numbers. Other displays might generate images of numbers and other characters as arrays of pixels shaped as dots. In such displays, pixels might appear as lighted white or colored discs. Special-purpose use might have custom pixels with custom shapes. It will be clear to those skilled in the art, after reading this disclosure, how to make and use embodiments of the present invention wherein pixels have a variety of shapes, color, arrangement and other characteristics.

Viewing Space—For the purposes of this disclosure, "viewing space" of a multi-view display is defined as the range of possible positions from which viewers of the multi-view display can experience the multi-view display functionality. In particular, the multi-view pixels of the multi-view display can emit beamlets in a range of possible directions. A viewer must be within that range in order to see at least one beamlet; otherwise, the multi-view pixel will not be usable for image forming. For a viewer to see an image that covers the entire display surface of the multi-view display, the viewer must be within the beamlet range of all multi-view pixels. The viewing space is the collection of all positions where this requirement is met.

Display designers are typically given a target range of possible positions for viewers to view a display. In a multi-view display, it is advantageous to orient multi-view pixels, relative to one another, such that all beamlet ranges overlap at all those viewer positions. Generally, this is likely to result in different orientations of multi-view pixels in different portions of the display surface, and it will be difficult to know, a priori, the relative orientation of all multi-view pixels. Calibration in accordance with embodiments of the present invention can provide the necessary orientation information and thus allow display designers the freedom to orient multi-view pixels as needed.

What is claimed:

1. A process for calibrating a multi-view display, in a viewing region, wherein the multi-view display comprises having a plurality of multi-view pixels (MVPs), each MVP comprising a two-dimensional array of individually controllable pixels, and a lens disposed in front of the two-dimensional array of pixels, wherein light propagates from each pixel, at least a portion of which light is received by the lens to form a beamlet having a direction unique from all other beamlets from the MVP that is based on a differing spatial relationship of each pixel to the lens, the process comprising simultaneously calibrating more than one of the MVPs by:

for at least a first multi-view pixel ("MVP") and a second MVP of the plurality of MVPs,
  (i) simultaneously flashing at least some of the beamlets of the first MVP and some of the beamlets of the second MVP, wherein each flashed beamlet of the first MVP is flashed with a first MVP identifier pattern and each flashed beamlet of the second MVP is flashed with a second MVP identifier pattern, and wherein the first and second MVP identifier patterns are different from one another;
  (ii) simultaneously flashing at least some of the beamlets of the first MVP, wherein each of said some beamlets is flashed in a unique beamlet identifier pattern, said unique beamlet identifier patterns thereby identifying the beamlets of the first MVP;
  (iii) simultaneously flashing at least some of the beamlets of the second MVP, wherein each of said some beamlets thereof is flashed in a unique beamlet identifier pattern, said unique beamlet identifier patterns thereby identifying the beamlets of the second MVP;
detecting, or not detecting, at a light detector situated at a first viewing location in the viewing region, flashes from the at least first and second MVPs;
identifying which of the at least first and second MVPs has been detected by the light detector via the first and second MVP identifier patterns;
identifying which beamlet from the at least first and second MPVs has been detected by the light detector via the unique beamlet identifier patterns; and
recording, in a storage medium, for each detected MVP, a respective relationship between each detected beamlet and the first viewing location.

2. The process of claim 1 wherein the unique pattern of flashing is based on a Gray code.

3. The process of claim 1 wherein the light detector is a camera.

4. The process of claim 1 further comprising generating estimated relationships between undetected beamlets and other viewing locations in the viewing region via one or more mathematical techniques.

5. The process of claim 4 wherein the one or more mathematical techniques selected from the group consisting of linear interpolation, linear extrapolation, non-linear interpolation, non-linear extrapolation, Taylor-series approximation, linear change of reference frame, non-linear change of reference frame, quadratic, spherical, and/or exponential models, and trigonometric manipulation.

6. The process of claim 1 wherein the light detector also comprises a light source, and wherein the process further comprises:
  detecting, at a fixed camera, a light emitted by the light source; and
  processing the detected light from the light source to yield coordinates of the first viewing location.

7. The process of claim 6 and further comprising:
  at the light source, changing the light emitted by the light source in accordance with a pattern that communicates information about the light source.

8. The process of claim 6 and further comprising:
  at the light source, changing the light emitted by the light source in accordance with a pattern that communicates information about the first viewing location.

9. The process of claim 1 further comprising generating, at a localization system, coordinates of the first viewing location, wherein the localization system is based on one or more localization technologies selected from the group consisting of a global positioning system, a global navigation satellite system, conventional cameras, stereoscopic cameras, depth-aware cameras, time-of-flight cameras, structured light scanners, indoor positioning systems, and altimeters.

10. A system for calibrating a multi-view display having multi-view pixels, wherein the system simultaneously calibrates more than one of the multi-view pixels (MVPs) of the multi-view display, the system comprising:
  the multi-view display having a plurality of multi-view pixels (MVPs), each MVP comprising:
    a two-dimensional array of individually controllable pixels, and
    a lens disposed in front of the two-dimensional array of pixels, wherein light propagates from each pixel, at least a portion of which light is received by the lens to form a beamlet having a direction unique from all other beamlets from the MVP that is based on a spatial angular relationship of each pixel to the lens;
  a multi-view display controller that, during calibration, commands the multi-view display to:
    (i) simultaneously flash at least some of the beamlets of each of at least two MVPs, wherein each flashed beamlet is flashed with a unique MVP identifier pattern that associates the flashed beamlet with a particular one of the at least two MVPs, wherein all beamlets associated with a particular MVP flash with the same MVP identifier pattern;
    (ii) simultaneously flash at least some of the beamlets of at least one of the at least two MVPs, wherein each of said some beamlets is flashed in a unique beamlet identifier pattern, said unique beamlet identifier pattern thereby identifying the associated beamlet of the at least one MVP;

a light detector for detecting flashes from the at least two MVPs and generating a detection outcome based thereon;

a localization system that generates an identification of a viewing location of the light detector within a viewing region of the multi-view display;

a processor that receives the detection outcome, the identification of the viewing location, and an identification of the MVPs and beamlets therefrom associated with the detected flashes, and generates respective relationships between each detected beamlet and the viewing location; and a storage medium into which the processor records the respective relationships.

11. The system of claim 10 wherein the light detector comprises a light source, and the localization system comprises a fixed camera that detects a light emitted by the light source, wherein the light emitted by the light source, as detected by the fixed camera, is processed to yield the identification of the viewing location.

12. The system of claim 11 wherein the light emitted by the light source changes in accordance with a pattern that communicates information about the light source.

13. The system of claim 10 wherein the localization system is based on one or more localization technologies selected from the group consisting of global positioning systems, global navigation satellite system, conventional cameras, stereoscopic cameras, depth-aware cameras, time-of-flight cameras, structured light scanners, indoor positioning systems, and altimeters.

14. The method of claim 1 and further wherein (ii) and (iii) are performed simultaneously.

15. The system of claim 10 and further wherein the controller simultaneously flashes the beamlets of each of the at least two MVPs, wherein each beamlet is flashed in a unique beamlet identifier pattern, said unique pattern thereby identifying the associated beamlet of the at least two MVPs.

* * * * *